United States Patent
Bening et al.

(10) Patent No.: US 11,014,850 B2
(45) Date of Patent: May 25, 2021

(54) SIOC CERAMIC AND PLASTIC ADDITIVES FOR CEMENTS, CONCRETES AND STRUCTURAL DECORATIVE MATERIALS

(71) Applicant: Melior Innovations, Inc., Houston, TX (US)

(72) Inventors: David Bening, Columbus, OH (US); Mark S. Land, Houston, TX (US)

(73) Assignee: Melior Innovations, Inc., Houston, TX (US)

( * ) Notice: Subject to any disclaimer, the term of this patent is extended or adjusted under 35 U.S.C. 154(b) by 0 days.

(21) Appl. No.: 16/171,267

(22) Filed: Oct. 25, 2018

(65) Prior Publication Data

US 2019/0263719 A1 Aug. 29, 2019

Related U.S. Application Data

(60) Provisional application No. 62/577,134, filed on Oct. 25, 2017.

(51) Int. Cl.
| | | |
|---|---|---|
| *C04B 14/32* | (2006.01) | |
| *C04B 35/571* | (2006.01) | |
| *C04B 40/00* | (2006.01) | |
| *C04B 28/02* | (2006.01) | |
| *C04B 111/82* | (2006.01) | |

(52) U.S. Cl.
CPC .......... *C04B 14/322* (2013.01); *C04B 14/324* (2013.01); *C04B 28/02* (2013.01); *C04B 35/571* (2013.01); *C04B 40/0042* (2013.01); *C04B 2111/82* (2013.01); *C04B 2235/3895* (2013.01); *C04B 2235/422* (2013.01)

(58) Field of Classification Search
CPC ... C04B 14/322; C04B 14/324; C04B 20/008; C04B 28/02; C04B 35/571; C04B 40/0042; C04B 40/0608; C04B 2111/82; C04B 2235/3895; C04B 2235/422
See application file for complete search history.

(56) References Cited

U.S. PATENT DOCUMENTS

| | | |
|---|---|---|
| 3,887,385 A | 6/1975 | Quist |
| 4,833,220 A | 5/1989 | Frey et al. |
| 4,877,820 A | 10/1989 | Cowan |
| 5,130,400 A | 7/1992 | Pachaly |
| 5,225,283 A | 7/1993 | Leung et al. |
| 5,356,471 A | 10/1994 | Reynders |
| 9,815,943 B2 | 11/2017 | Sherwood et al. |
| 9,815,952 B2 | 11/2017 | Sherwood |
| 10,221,660 B2 | 3/2019 | Moeller et al. |
| 2003/0137737 A1 | 7/2003 | Phillips |
| 2004/0166308 A1 | 8/2004 | Raksha |
| 2005/0154082 A1 | 7/2005 | DeLuca, Jr. |
| 2006/0022198 A1 | 2/2006 | Aramata et al. |
| 2006/0225609 A1 | 10/2006 | Rueger |
| 2007/0212487 A1 | 9/2007 | Anselmann |
| 2011/0311767 A1 | 12/2011 | Elahee |
| 2012/0261606 A1 | 10/2012 | Hollman |
| 2015/0175750 A1* | 6/2015 | Hopkins ............... C08G 77/12 51/298 |
| 2015/0252166 A1* | 9/2015 | Dukes ..................... A61Q 3/02 424/61 |
| 2015/0252170 A1 | 9/2015 | Diwanji et al. |
| 2015/0252171 A1 | 9/2015 | Molnar |
| 2016/0060169 A1 | 3/2016 | Byrd |
| 2016/0176223 A1 | 6/2016 | Degott |
| 2017/0183514 A1 | 6/2017 | Benac et al. |
| 2017/0253720 A1 | 9/2017 | Hopkins et al. |
| 2017/0368668 A1 | 12/2017 | Dukes |
| 2018/0194945 A1 | 7/2018 | Hopkins et al. |
| 2018/0201115 A1 | 7/2018 | Venturi |
| 2019/0337842 A1 | 11/2019 | Bening et al. |
| 2020/0002226 A1 | 1/2020 | Bening, Jr. et al. |

FOREIGN PATENT DOCUMENTS

| | | |
|---|---|---|
| CN | 201110211590.9 | 12/2011 |
| WO | WO 2009/133765 | 5/2009 |

OTHER PUBLICATIONS

Mar. 21, 2018, Chinese Patent Office, Translation of Office Action Appl No. 201500230118.6.
Nov. 30, 2017, EPO, Search Report Appl No. 15755897.4.
2006, Dhoke, Performance of black pigments incorporated in.
Dec. 14, 2017, PCT, Search Report Appl No. PCT/US17/50780.
Dec. 14, 2017, PCT, Opinion Appl No. PCT/US17/50780.
Jun. 12, 2019, PCT, Opinion Appl No. PCT/US18/57598.

* cited by examiner

*Primary Examiner* — Anthony J Green

(57) ABSTRACT

Cement, concrete, stucco, and plaster that are have black ceramic polymer derived pigments, and in embodiments have a uniform blackness throughout the structure. In embodiments the black pigment is a ceramic SiOC, that has a size of about 0.8 μm.

19 Claims, 10 Drawing Sheets

SIOC CERAMIC AND PLASTIC ADDITIVES FOR CEMENTS, CONCRETES AND STRUCTURAL DECORATIVE MATERIALS

This application: claims the benefit of U.S. provisional application Ser. No. 62/577,134 filed Oct. 25, 2017, the entire disclosure of which is incorporated herein by reference.

BACKGROUND OF THE INVENTION

Field of the Invention

The present inventions relate to additives for pourable and moldable and solidifiable compositions and materials, such composition having the additives therein, and methods of making the same. In particular, embodiments of the present inventions relate to additives that impart features and properties to cement, concrete, asphalt, stucco, plaster, clays, sands, and glasses.

As used herein, unless stated otherwise, the term "cement" is to be given its broadest possible meaning and would include, materials that are made from lime, iron, silica and alumina at temperatures in the general range of about 2,500 (1,371° C.) to 2,800° F. (1,537.8° C.), materials that are made from calcium, silicon, aluminum, iron and gypsum at temperatures in the general range of about 2,500 (1,371° C.) to 2,800° F. (1,537.8° C.) roman cements, portland cements, hydraulic cements, blended hydraulic cements, materials that meet, portland-limestone cement, portland-slag cement, portland-pozzonlan cement, ternary blended cements, sulfate resistant cements, or have components that meet, one or more of the following American Society for Testing and Materials ("ASTM") standards, (which standards are incorporated herein by reference) ASTM C150, ASTM C595, C1157, ASTM 109. The term cement includes the dry, wet and hardened states or forms of these materials.

As used herein, unless stated otherwise, the term "concrete" is to be given its broadest possible meaning and would include, materials that have an aggregate and a binder, which is typically cement. Water is added to this mixture and a chemical reaction takes place over time to provide a solid material or structure. The term concrete includes the dry, wet and hardened states of these materials. Further, it is understood that other additives and materials may be added or included such as polymer (liquid), polymer emulsions—water based. These additional additive can function for example to start cure reactions, to regulate cure reactions, to impart properties, and combinations and variations of these.

As used herein, unless stated otherwise, the term "pourable" is to be given its broadest possible meaning and would include liquids, powders, molten materials, flowable pastes, and gases. As used herein with respect to cement or concrete, the term references to both the powdered mixture (e.g., dry mix) and the liquid mixture when water is added (e.g., ready-mix) before the cement or concrete sets-up into a semi-solid and then solid material.

As used herein, unless stated otherwise, room temperature is 25° C. And, standard ambient temperature and pressure is 25° C. and 1 atmosphere. Unless expressly stated otherwise all tests, test results, physical properties, and values that are temperature dependent, pressure dependent, or both, are provided at standard ambient temperature and pressure, this would include viscosities.

Generally, the term "about" and the symbol "~" as used herein unless stated otherwise is meant to encompass a variance or range of ±10%, the experimental or instrument error associated with obtaining the stated value, and preferably the larger of these.

As used herein, unless specified otherwise the terms %, weight % and mass % are used interchangeably and refer to the weight of a first component as a percentage of the weight of the total, e.g., formulation, mixture, preform, material, structure or product. The usage X/Y or XY indicates weight % of X and the weight % of Y in the formulation, unless expressly provided otherwise. The usage X/Y/Z or XYZ indicates the weight % of X, weight % of Y and weight % of Z in the formulation, unless expressly provided otherwise.

As used herein, unless specified otherwise "volume %" and "% volume" and similar such terms refer to the volume of a first component as a percentage of the volume of the total, e.g., formulation, mixture, preform, material, structure or product.

As used herein unless specified otherwise, the recitation of ranges of values herein is merely intended to serve as a shorthand method of referring individually to each separate value falling within the range. Unless otherwise indicated herein, each individual value within a range is incorporated into the specification as if it were individually recited herein.

This Background of the Invention section is intended to introduce various aspects of the art, which may be associated with embodiments of the present inventions. Thus, the forgoing discussion in this section provides a framework for better understanding the present inventions, and is not to be viewed as an admission of prior art.

SUMMARY

Accordingly, there has been a long-standing and increasing need for new and improved features for cements, concretes, road surface, floors, countertops and other pourable structural and design materials. In particular, there has been a long-standing, unfulfilled and growing need for black and colored concretes and cements. The present invention, among other things, solves these needs by providing the materials, compositions, and methods taught herein.

Accordingly, there is provided a black cement including a dry powdered cement and a black SiOC ceramic pigment.

Yet further, there is provided these methods, materials, compositions, cements, stuccos, plasters and concretes having one or more of the following features: including about 6% to about 15% black SiOC ceramic pigment; including at least about 8% black SiOC ceramic pigment; including at least about 10% black SiOC ceramic pigment; wherein the black SiOC ceramic pigment comprises from about 30 weight % to about 60 weight % silicon, from about 5 weight % to about 40 weight % oxygen, and carbon; wherein about 20 weight % to about 80 weight % of the carbon is free carbon; wherein the black SiOC ceramic pigment comprises from about 20% to about 65% Si, about 5% to about 50% O, and about 3% to about 55% carbon weight percent; wherein the black SiOC ceramic pigment comprises from about 15.3 mole % to about 63.1 mole % silicon, from about 8.8 mole % to about 56.8 mole % oxygen, and at least about 6.3 mole % carbon and wherein about 20 weight % to about 80 weight % of the carbon is silicon-bound-carbon; and, wherein the black SiOC ceramic pigment comprises from about 15.3 mole % to about 63.1 mole % silicon, from about 8.8 mole % to about 56.8 mole % oxygen, and at least about 6.3 mole % carbon, and wherein about 20 weight % to about 80 weight % of the carbon is silicon-bound-carbon and about 80 weight % to about 20 weight % of the carbon is free carbon.

Moreover, there is provided, a black concrete including a dry powdered cement, aggregate and a black SiOC pigment.

Still additionally, there is provided a black cement, concrete, stucco or plaster material including: a first material and a second material; wherein the first material defines a first material weight percent of the cement, concrete, stucco or plaster and the second material defines a second material weight percent of the cement, concrete, stucco or plaster; wherein the second material is a black polymer derived ceramic pigment and wherein the first material weight percent is larger than the second material weight percent; wherein the black polymer derived ceramic pigment is uniformly distributed in the first material, thereby providing a uniform black color throughout the entirety of a structure formed from the black cement, concrete, stucco or plaster.

In addition, there is provided these methods, materials, compositions, cements, stuccos, plasters and concretes having one or more of the following features: wherein the pigment comprises from about 20 weight % to about 65 weight % silicon, from about 5 weight % to about 40 weight % oxygen, and at least 5% carbon; wherein 20 weight % to 80 weight % of the carbon is free carbon; wherein 20 weight % to 80 weight % of the carbon is silicon-bound-carbon; wherein the black polymer derived ceramic material has a particle size of less than about 1.5 μm; wherein the black polymer derived ceramic material has a particle size $D_{50}$ of from about 1 μm to about 0.1 μm; wherein the material, cement, concrete, stucco or plaster defines a blackness selected from the group consisting of: PMS 433, Black 3, Black 3, Black 4, Black 5, Black 6, Black 7, Black 2 2×, Black 3 2×, Black 4 2×, Black 5 2×, Black 6 2×, and Black 7 2×; wherein the material, cement, concrete, stucco or plaster defines a uniform blackness throughout the structure selected from the group consisting of: PMS 433, Black 3, Black 3, Black 4, Black 5, Black 6, Black 7, Black 2 2×, Black 3 2×, Black 4 2×, Black 5 2×, Black 6 2×, and Black 7 2×; wherein the material, cement, concrete, stucco or plaster defines a blackness selected from the group consisting of: Tri-stimulus Colorimeter of X from about 0.05 to about 3.0, Y from about 0.05 to about 3.0, and Z from about 0.05 to about 3.0; a CIE L a b of L of less than about 40; a CIE L a b of L of less about 20; a CIE L a b of L of less than 50, b of less than 1.0 and a of less than 2; and a jetness value of at least about 200 $M_y$; wherein the material, cement, concrete, stucco or plaster is essentially free of heavy metals; wherein the cement, concrete, stucco or plaster has less than about 10 ppm of heavy metals; the pigment is a UV absorber; wherein the black polysilocarb derived ceramic pigment particles have a size $D_{50}$ of less than about 1 μm; wherein the black polysilocarb derived ceramic pigment, wherein the primary pigment particles have a size $D_{50}$ of about 1 μm; wherein the primary pigment particles have a size $D_{50}$ of about 1.5 μm; wherein the primary pigment particles have a size $D_{50}$ of about 2 μm; wherein the black polysilocarb derived ceramic pigment has an oil absorption of less than about 50 g/100 g; and thereby imparts oil resistivity to the structure formed from the black cement, concrete, stucco or plaster; wherein the black polysilocarb derived ceramic pigment has an oil absorption of less than about 20 g/100 g; and thereby imparts oil resistivity to the structure formed from the black cement, concrete, stucco or plaster; wherein the black polysilocarb derived ceramic has a primary particle $D_{50}$ size of from about 0.1 μm to about 1.5 μm; wherein the black polysilocarb derived ceramic pigment has a primary particle $D_{50}$ size of greater than about 0.1 μm; wherein the polymer derived ceramic pigment has a primary particle $D_{50}$ size of less than about 10.0 μm; wherein the black polysilocarb derived ceramic pigment has a primary particle $D_{50}$ size of from about 0.1 μm to about 3.0 μm; wherein the black polysilocarb derived ceramic pigment of claim 60, wherein the polymer derived ceramic pigment has a primary particle $D_{50}$ size of from about 1 μm to about 5.0 μm; wherein the black polysilocarb derived ceramic pigment is non-conductive; wherein the black polysilocarb derived ceramic pigment is hydrophilic; and wherein the black polysilocarb derived ceramic pigment is hydrophobic; and thereby imparts hydrophobicity to the structure formed from the black cement, concrete, stucco or plaster.

Moreover, there is provided a method for making a black cement, concrete, stucco or plaster structure, including the activities of adding a pyrolized polymer derived ceramic black pigment to a cement, concrete, stucco or plaster material, mixing the combined pigment and material to provide a uniform distribution of the pigment within the material, forming the material into a shape, hardening the material into a black cement, concrete, stucco or plaster structure, whereby the hardened structure has a uniform black color throughout the entirety of a structure.

In addition, there is provided these methods, materials, compositions, cements, stuccos, plasters and concretes having one or more of the following features: wherein the pigment comprises at least about 2% of the structure; wherein the pigment comprises at least about 5% of the structure; wherein the pigment comprises at least about 8% of the structure; wherein the pigment comprises at least about 10% of the structure; wherein the pigment comprises at least about 12% of the structure; wherein the pigment comprises about 3% to about 8% of the structure; wherein the pigment is added to a dry material; wherein the pigment is added to a wet material; wherein the pigment is added to a liquid material; wherein the pigment has a particle size $D_{50}$ of less than about 4 μm; wherein the pigment has a particle size $D_{50}$ of from about 3 μm to about 0.1 μm; wherein the pigment has a particle size $D_{50}$ of from about 2 μm to about 0.5 μm; wherein the structure defines a blackness selected from the group consisting of: PMS 433, Black 3, Black 3, Black 4, Black 5, Black 6, Black 7, Black 2 2×, Black 3 2×, Black 4 2×, Black 5 2×, Black 6 2×, and Black 7 2×; wherein the structure defines a uniform blackness throughout the structure, selected from the group consisting of: PMS 433, Black 3, Black 3, Black 4, Black 5, Black 6, Black 7, Black 2 2×, Black 3 2×, Black 4 2×, Black 5 2×, Black 6 2×, and Black 7 2×; wherein the structure defines a blackness selected from the group consisting of: Tri-stimulus Colorimeter of X from about 0.05 to about 3.0, Y from about 0.05 to about 3.0, and Z from about 0.05 to about 3.0; a CIE L a b of L of less than about 40; a CIE L a b of L of less about 20; a CIE L a b of L of less than 50, b of less than 1.0 and a of less than 2; and a jetness value of at least about 200 $M_y$; wherein the structure defines a uniform blackness throughout the structure, selected from the group consisting of: Tri-stimulus Colorimeter of X from about 0.05 to about 3.0, Y from about 0.05 to about 3.0, and Z from about 0.05 to about 3.0; a CIE L a b of L of less than about 40; a CIE L a b of L of less about 20; a CIE L a b of L of less than 50, b of less than 1.0 and a of less than 2; and a jetness value of at least about 200 $M_y$; wherein the pigment comprises about 40 weight % to about 50 weight % silicon, and wherein about 25 weight to about 40 weight % of the carbon is silicon-bound-carbon; wherein the pigment comprises about 40 weight % to about 50 weight % silicon, and wherein about 55 weight % to about 75 weight % of the carbon is free carbon; wherein the pigment comprises about 20 weight % to about 30 weight % oxygen, and wherein about 25 weight % to about 40 weight % of the carbon is silicon-bound-carbon; wherein the pigment comprises about 20 weight % to about 30 weight % oxygen, and wherein about 55 weight % to about 75 weight % of the carbon is free carbon; wherein the pigment comprises about 40 weight % to about 50 weight % silicon, and wherein about 25 weight % to about 40 weight % of the carbon is silicon-bound-carbon.

DESCRIPTION OF THE PREFERRED EMBODIMENTS

Figure 1:
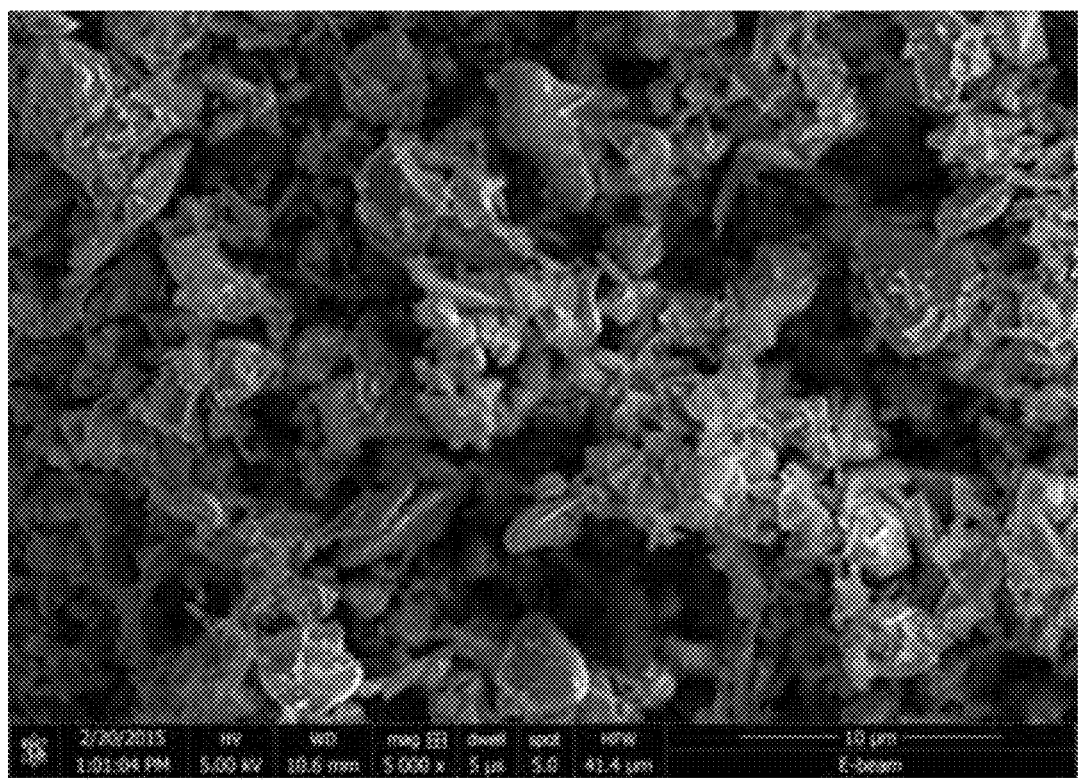
FIG. 1 is an SEPM of an SiOC black pigment for embodiments of the black cement, concrete, stucco, plaster, and other materials in accordance with the present inventions.
Figure 2:
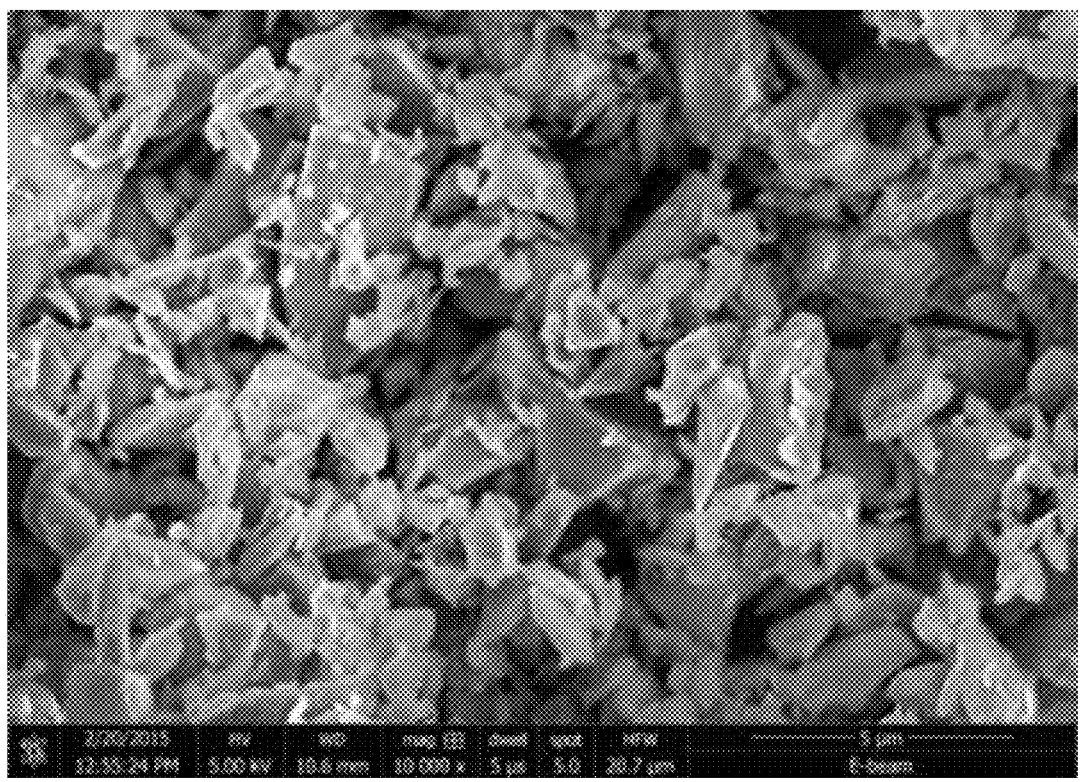
FIG. 2 is an SEPM of an SiOC black pigment for embodiments of the black cement, concrete, stucco, plaster, and other materials in accordance with the present inventions.
Figure 3:
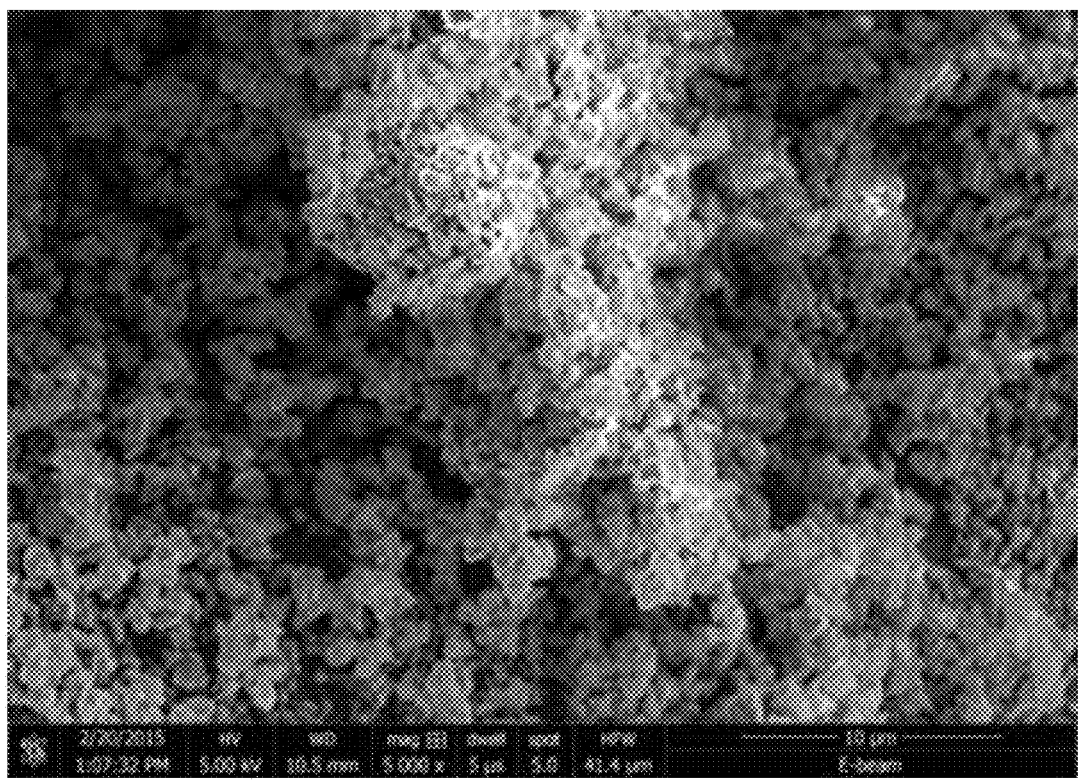
FIG. 3 is an SEPM of an SiOC black pigment for embodiments of the black cement, concrete, stucco, plaster, and other materials in accordance with the present inventions.
Figure 4:
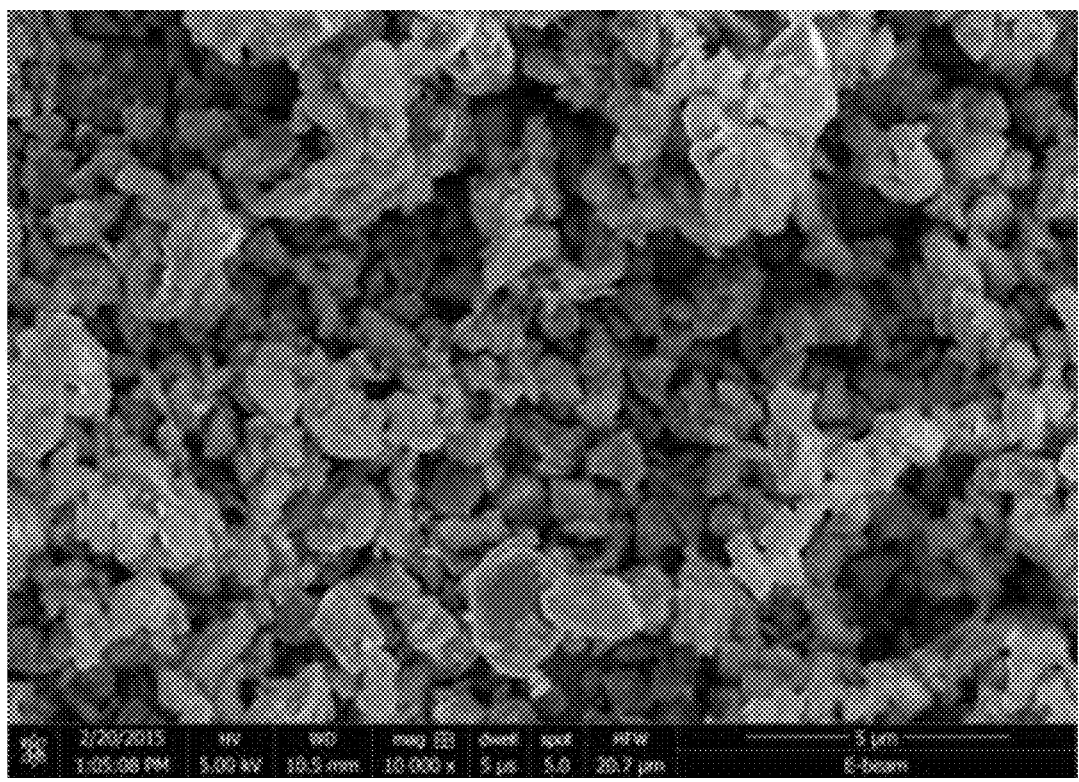
FIG. 4 is an SEPM of an SiOC black pigment for embodiments of the black cement, concrete, stucco, plaster, and other materials in accordance with the present inventions.
Figure 5:
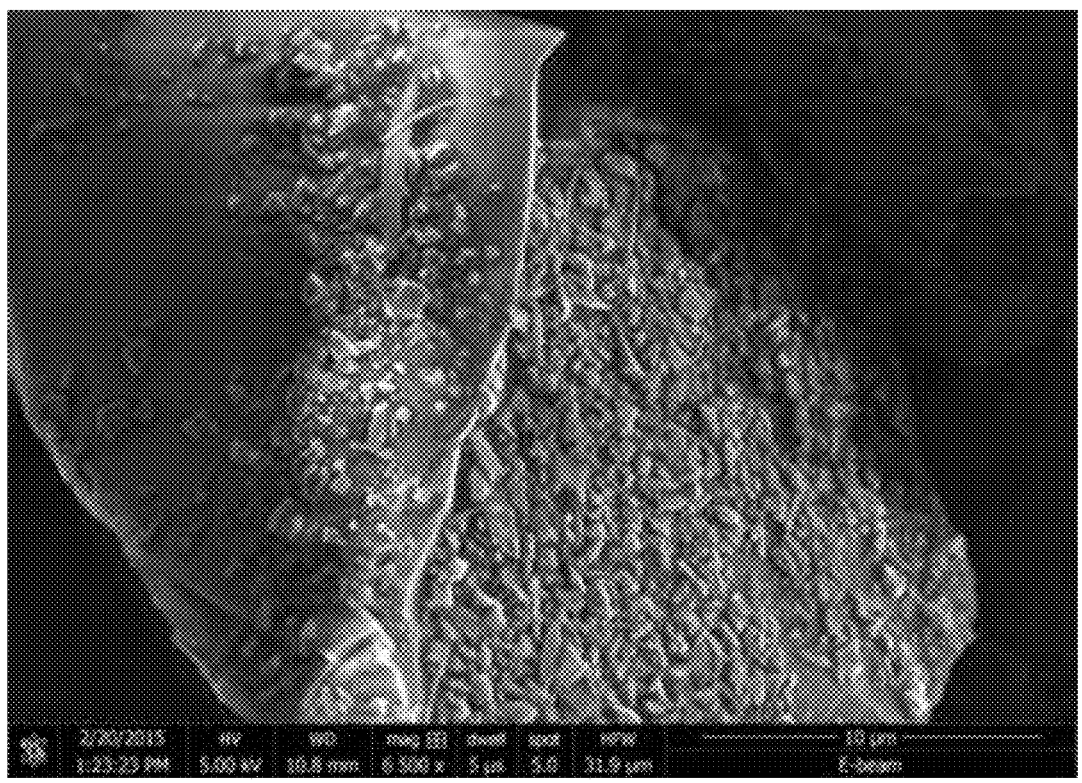
FIG. 5 is an SEPM of an SiOC black pigment for embodiments of the black cement, concrete, stucco, plaster, and other materials in accordance with the present inventions.
Figure 6:
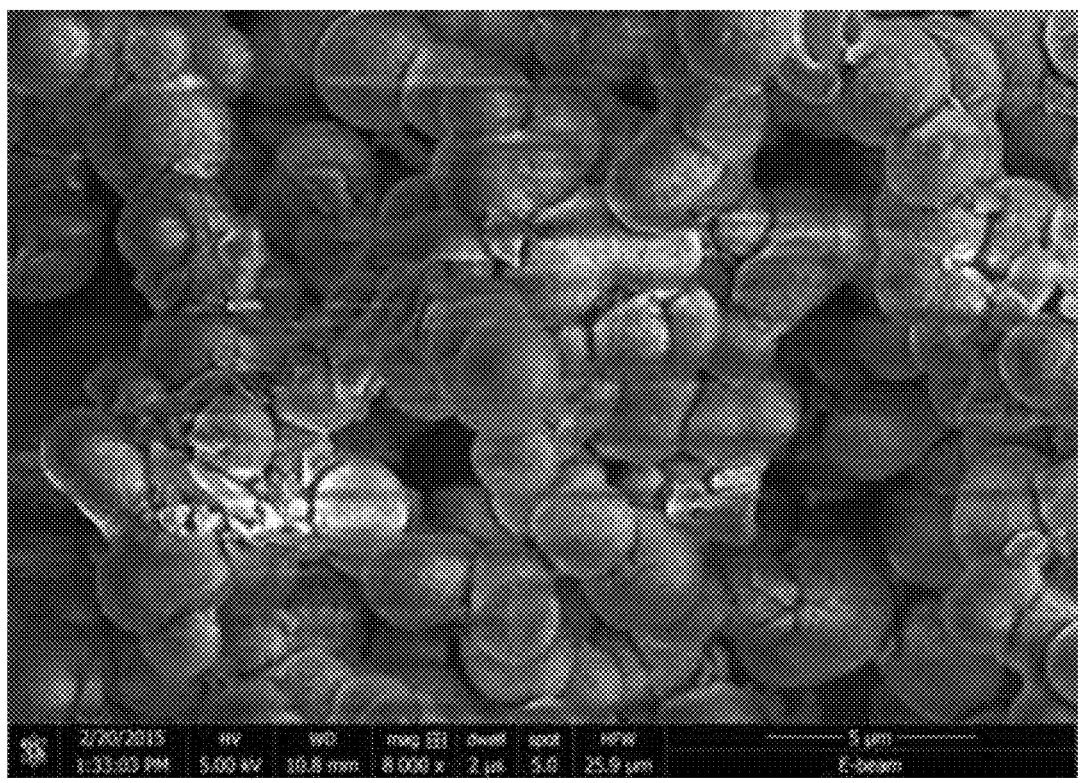
FIG. 6 is an SEPM of an SiOC black pigment for of the black cement, concrete, stucco, plaster, and other materials in accordance with the present inventions.
Figure 7:
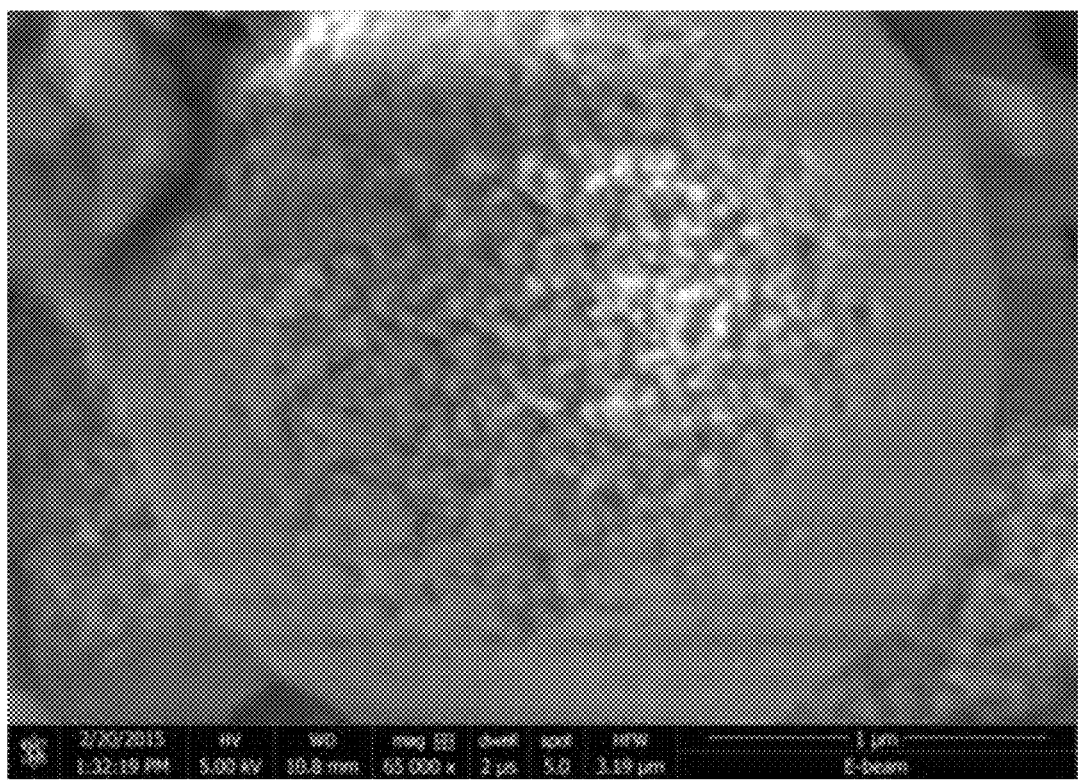
FIG. 7 is an SEPM of an SiOC black pigment for embodiments of the black cement, concrete, stucco, plaster, and other materials in accordance with the present inventions.
Figure 8:
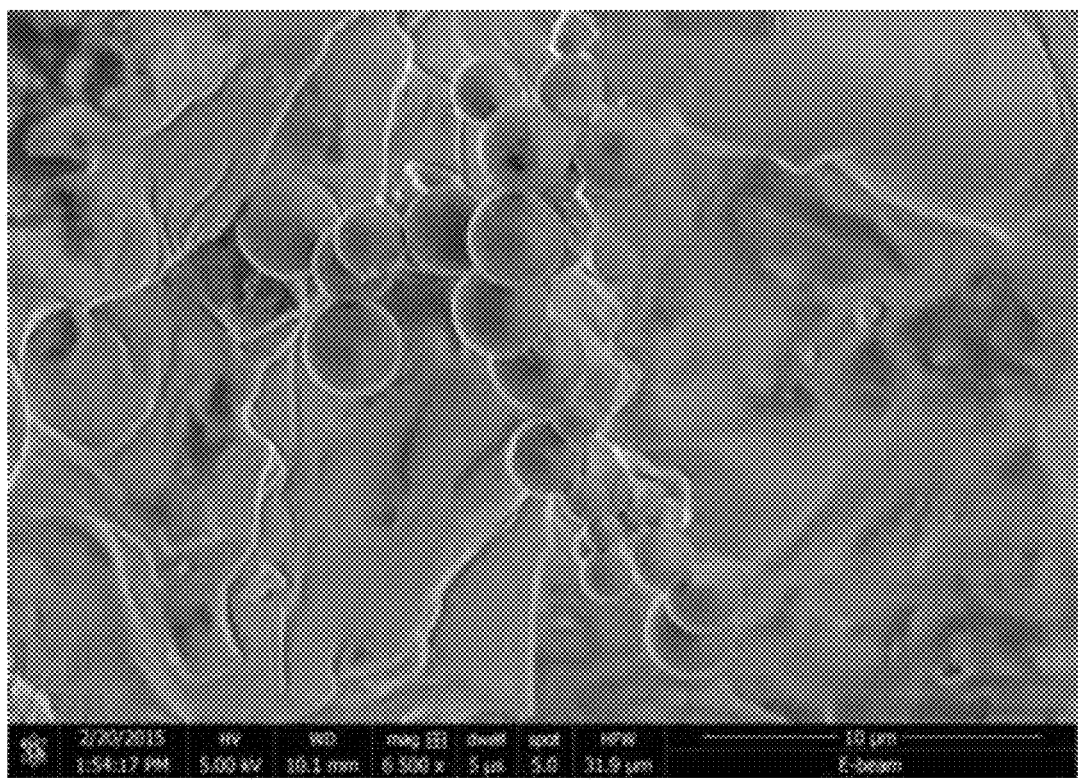
FIG. 8 is an SEPM of an SiOC black pigment for embodiments of the black cement, concrete, stucco, plaster, and other materials in accordance with the present inventions.
Figure 9:
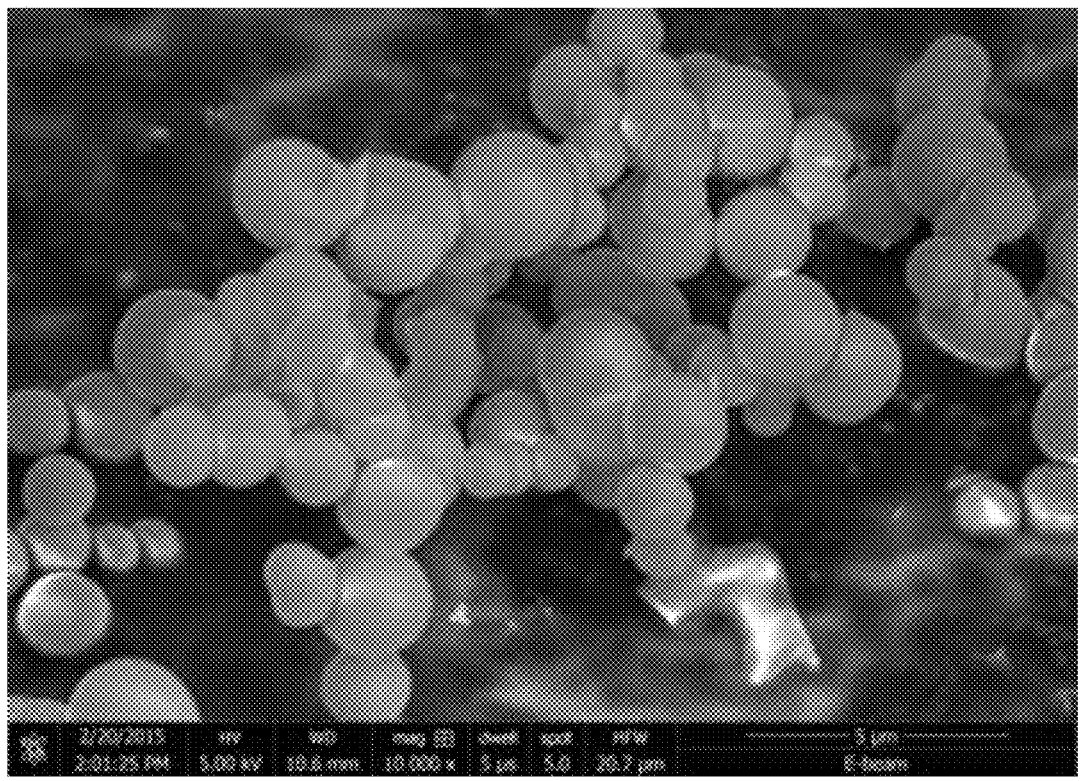
FIG. 9 is an SEPM of an SiOC black pigment for embodiments of the black cement, concrete, stucco, plaster, and other materials in accordance with the present inventions.
Figure 10:
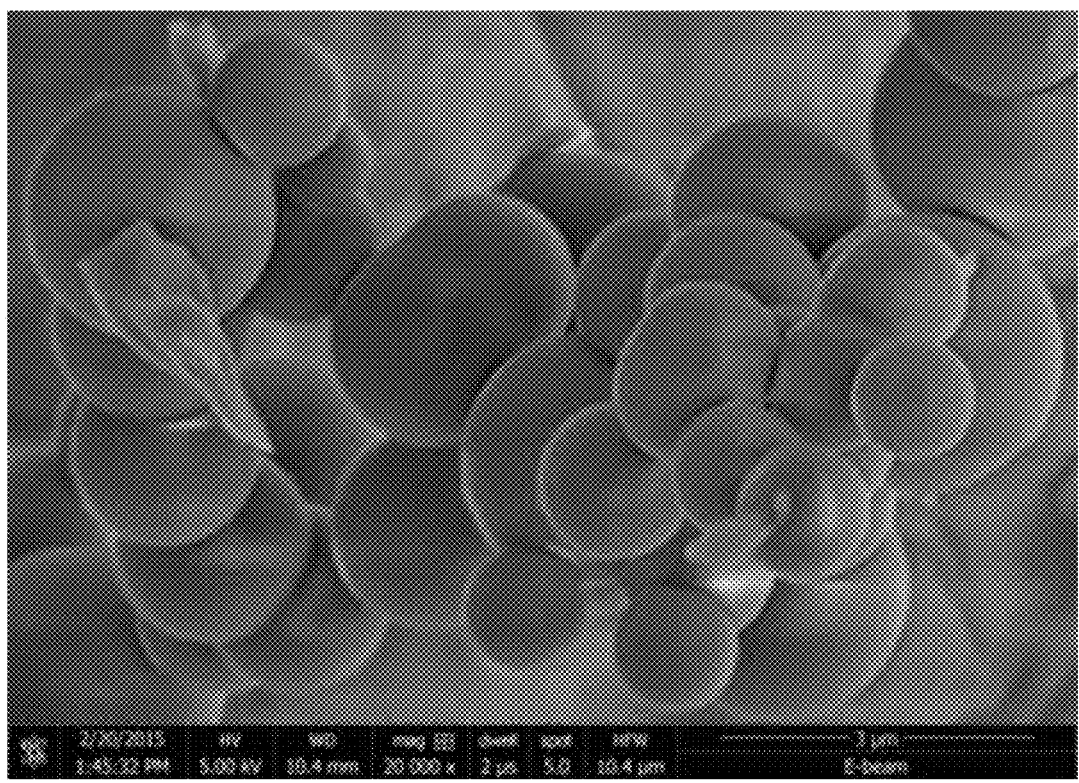
FIG. 10 is an SEPM of an SiOC black pigment for embodiments of the black cement, concrete, stucco, plaster, and other materials in accordance with the present inventions.

The embodiments of the present inventions include additives for pourable and moldable and solidifiable compositions and materials, and such composition having the additives therein; as well as, the methods to make these compositions and materials. In particular, preferred embodiments of the present inventions relate to the use of, or addition of, additives that impart features and properties including color to cement, concrete, asphalt, plaster, clays, sands, glasses and the like.

In general, the additives to these compositions and materials are cured polymer derived ceramics, pyrolized polymer derived ceramics and combinations and variations of these. In preferred embodiments, the additives are SiOC cured materials, SiOC pyrolized materials, and combinations and variations of these. Generally, embodiments of the present compositions and materials find application in roads, flooring, counter tops, concrete roads, concrete flooring, concrete drives, stamped concrete, concrete beams structures and supports, concrete counter tops, stucco, swimming pools, decks, cement structures, pavers, custom blocks, bricks, simulated stone, ceramic tiles, porcelain tiles, other porcelain and ceramic structures, ceramic and porcelain tiles that contain cured polymer derived ceramic material, pyrolized polymer derived ceramic materials and combinations and variations of these. The present inventions further relate to systems methods and applications for making and using these materials, compositions, and products based upon these materials.

In preferred embodiments the additives are silicon (Si) based materials, including polyorganic materials that also contain silicon, that are typically and preferably easy to manufacture, handle and have surprising and unexpected properties and applications. These silicon based materials have applications and utilizations as a liquid material, a cured material (e.g., a plastic), a preceramic, and a pyrolized material (e.g., a ceramic).

In particular, embodiments of these silicon based compositions have applications as additives for providing color to cement and concrete. In this manner the additives provide color throughout the concrete or cement structure. In addition to providing color through out the structure, these additives can also provide improved features, such as wear resistance, hardness, and strength, to name a few.

Embodiments of these additives are polymer derived ceramic ("PDC") materials. Preferred embodiments of the present additives and compositions having these additives, preferably use, are based upon or constitute PDCs that are "polysilocarb" materials, e.g., materials containing silicon (Si), oxygen (O) and carbon (C), and embodiments of such materials that have been cured, and embodiments of such materials that have been pyrolized. Polysilocarb materials may also contain other elements. Polysilocarb materials are made from one or more polysilocarb precursor formulation or precursor formulation. The polysilocarb precursor formulation contains one or more functionalized silicon polymers, or monomers, non-silicon based cross linkers, as well as, potentially other ingredients, such as for example, inhibitors, catalysts, fillers, dopants, modifiers, initiators, reinforcers, fibers, particles, colorants, pigments, dies, the same or other PDCs, ceramics, metals, metal complexes, and combinations and variations of these and other materials and additives. Silicon oxycarbide materials, SiOC compositions, and similar such terms, unless specifically stated otherwise, refer to polysilocarb materials, and would include liquid materials, solid uncured materials, cured materials, ceramic materials, and combinations and variations of these.

Examples of PDCs, PDC formulations, potential precursors, starting materials, and apparatus and methods for making these materials, that can be used, or adapted and improved upon employing the teachings of this specification to be used, in embodiments of the present inventions are found, for example, in US Patent Publication Nos. 2014/0274658, 2014/0323364, 2015/0175750, 2016/0207782, 2016/0280607, 2017/0050337, 2008/0095942, 2008/0093185, 2007/0292690, 2006/0069176, 2006/0004169, and 2005/0276961, and U.S. Pat. Nos. 9,499,677, 9,481,781, 8,742,008, 8,119,057, 7,714,092, 7,087,656, 5,153,295, and 4,657,991, and the entire disclosures of each of which are incorporated herein by reference.

Generally, the liquid polysilocarb precursor formulation is cured to form a solid or semi-sold material, e.g., cured material, green material, or plastic material. This material may be further cured, under predetermined conditions. The material may also be pyrolized under predetermined conditions to form a ceramic material. These processing conditions, and the particular formulations, can typically, contribute to the performance, features and properties of the end product or material. Typically, inhibitors and catalysis, as well as, or in addition to the selection of curing conditions, may be used to determine, contribute to, or otherwise affect, processing conditions, as well as, end properties of the material.

Generally, the polysilocarb additives can be added to the dry material or the wet material. These SiOC additives can be particles, beads, fibers, staple fibers and flakes, as well as any of the other volumetric shapes disclosed herein. The particles can have diameters of from 0.1 µm to about 10 µm, about 0.5 µm, about 1 µm, about 2 µm, about 3 µm, about 5 µm, from 0.5 µm to 1.5 µm, from 0.1 to less than 1 µm, and smaller and larger sizes, as well as any size within these ranges are contemplated. Fibers can have diameters from 0.5 µm to 500 µm, about 0.5 µm, about 1 µm, about 2 µm, about 3 µm, about 5 µm, about 10 µm, about 50 µm, about 100 µm, about 200 µm, about 300 µm, about 400 µm, about 500 µm, and smaller and larger sizes, as well as any size within these ranges are contemplated. The fibers can have lengths from about 0.1 mm, about 0.5 mm, about 1 mm, about 1.5 mm, about 2 mm, about 5 mm, about 10 mm, and longer and shorter lengths as well as any lengths within these ranges is contemplated.

Additionally, embodiments of the SiOC additives can be any of the sizes, e.g., diameters or cross sections, set forth in Table 1

TABLE 1

| U.S. Mesh (i.e., mesh) | Inches | Microns (µm) | Millimeters (mm) |
|---|---|---|---|
| 3 | 0.2650 | 6730 | 6.730 |
| 4 | 0.1870 | 4760 | 4.760 |
| 5 | 0.1570 | 4000 | 4.000 |
| 6 | 0.1320 | 3360 | 3.360 |
| 7 | 0.1110 | 2830 | 2.830 |
| 8 | 0.0937 | 2380 | 2.380 |
| 10 | 0.0787 | 2000 | 2.000 |
| 12 | 0.0661 | 1680 | 1.680 |
| 14 | 0.0555 | 1410 | 1.410 |
| 16 | 0.0469 | 1190 | 1.190 |
| 18 | 0.0394 | 1000 | 1.000 |
| 20 | 0.0331 | 841 | 0.841 |
| 25 | 0.0280 | 707 | 0.707 |
| 30 | 0.0232 | 595 | 0.595 |
| 35 | 0.0197 | 500 | 0.500 |
| 40 | 0.0165 | 400 | 0.400 |
| 45 | 0.0138 | 354 | 0.354 |
| 50 | 0.0117 | 297 | 0.297 |
| 60 | 0.0098 | 250 | 0.250 |
| 70 | 0.0083 | 210 | 0.210 |
| 80 | 0.0070 | 177 | 0.177 |
| 100 | 0.0059 | 149 | 0.149 |
| 120 | 0.0049 | 125 | 0.125 |
| 140 | 0.0041 | 105 | 0.105 |
| 170 | 0.0035 | 88 | 0.088 |
| 200 | 0.0029 | 74 | 0.074 |
| 230 | 0.0024 | 63 | 0.063 |
| 270 | 0.0021 | 53 | 0.053 |
| 325 | 0.0017 | 44 | 0.044 |
| 400 | 0.0015 | 37 | 0.037 |

In an embodiment, the cured polysilocarb material is added to the starting materials of the cement and is pyrolized during the cement forming process, typically a rotary kiln.

The particle size distribution for the polysilocarb additives can be very narrow, or it can be broad, having many different size of materials. Further, the additive can have a multimodel particle size distribution have one, two, three, four or more narrowly distributed particle sizes combined.

In embodiments, black cements and black concretes are contemplated. The black color is uniform throughout the entirety of the final solidified cement or concrete structure, e.g., drive way, paver block, counter top, floor. Thus, unlike dies, inks, or paints that are used on structures and only provide a surface coating, or generally a surface having color, embodiments of the present invention provide color throughout the depth of the structure, and in preferred embodiments the color of the structure is uniform throughout the structure. In this manner if the structure wears, is scratched or chipped, the color of the underlying material will be the same as the surface, The SiOC pigment can be any of the pyrolized pigments set in this specification, including the Appendix to the priority application, and which is incorporated herein in its entirety by reference. The SiOC pigment can have the final ceramic composition of pyrolized materials descripted in this Specification.

In general, the polysilocarb additives can be added to composite materials. As used herein unless stated otherwise, composite materials are any materials that have one or more of the components can constitute the bulk, or matrix phase, (e.g., a continuous, or substantially continuous phase) and one or more components that constitute a dispersed or non-continuous phase.

The polysilocarb, preferably ceramic, additive can be added to the composite material as a part of the matrix material, a part of the dispersed material, after the matrix and dispersed materials have been combined, and during forming, casting or otherwise shaping of the composite material. For example, with concrete, the polysilocarb pigment can be added to the dry cement, can be added to the dry concrete (e.g., cement with aggregate) and can be added to the wet pourable concrete.

In general, for materials the amount of additive can range from about 1% additive to about 99% material, to about 99% additive and 1% material, as well as any specific ration within these ranges are contemplated. For composites, generally the amount of additive is calculated with respect to the bulk or matrix phase material. Thus, for composites, the amount of additive can range from about 1% additive to about 99% matrix material, to about 99% additive and 1% matrix material, as well as any specific ration within these ranges are contemplated. In this manner, when view as a percentage weight of the entire composite, e.g., cement and aggregate, the ratio of additive to composite (e.g., concrete) will be lower.

Generally, for materials, such as concrete, cement, stucco, and plaster, to obtain a black color, i.e., a black concrete, cement, plaster or stucco, the amount of ceramic black polysilocarb pigment additives is from about 2%, about 5%, about 8%, about 9%, about 10% about 15% about 20%, from about 7%-11%, about 8-10% and greater and smaller amounts, as well as any amounts within these ranges, the weight of the material. It being understood that in some application the use more pigment may result in deeper or blacker, blacks, and in other situations a sufficient blackness to me customer demands can be obtained with less pigment.

Generally, for concrete and cement to obtain a uniform black material about 6-20%, about 7%-15%, 6%-12%, about 8%-10%, about 8%, about 9%, about 10%, about 11%, by weight of pigment to dry weight of cement is need. It being understood that any ratio within these ranges is also contemplated, and higher and lower amounts of pigment are contemplated as well.

Further, the forgoing weight percents are based on additive to dry cement. For concretes, it will be recognized that this would equate out to lower %, e.g., about 2-15%, about 3-12%, about 2%, about 3% about 5%, about 7%, about 10%, by weight of pigment to dry weight of the cement depending on aggregate content of the concrete.

While uniform color, and thus uniform distribution of the pigment is a preferred embodiment, the density of the pigment can be controlled during pyrolysis, and thus the pigment can be made heavier or lighter, and depending upon the viscosity of the wet cement or concrete can have a controlled settling rate to provide a varied color distribution.

Although the specification focus on black cement, concrete and materials, it is understood that other colors can be obtained. The black pigment can be mixed with other pigments to obtain deeper blues, reds, etc., less black pigment can be used to obtain varying greys, and the SiOC pigment itself can have other color, and surface effects, e.g., sparkle, than just black.

Embodiments of the SiOC pigment have hydrophilic surfaces, and as such, in preferred embodiments no wetting agents or other additives are required in order for the pigments to be uniformly dispersed in aqueous compositions of the matrix material, e.g., in the wet cement.

EXAMPLES

The following examples are provided to illustrate various embodiments of systems, processes, compositions, applications and materials of the present inventions. These examples are for illustrative purposes, may be prophetic, and should not be viewed as, and do not otherwise limit the scope of the present inventions. The percentages used in the examples, unless expressly provided otherwise, are weight percents of the total, e.g., formulation, mixture, product, or structure. The usage X/Y or XY indicates % of X and the % of Y in the formulation, unless expressly provided otherwise. The usage X/Y/Z or XYZ indicates the % of X, % of Y and % of Z in the formulation, unless expressly provided otherwise.

Example 1

A hardened cement structure, such as for example, a driveway, a floor, a counter top, a paver, a pillar, a road, a cross-member, or a wall, having an SiOC ceramic black pigment and having uniform color distribution throughout the cement structure.

Example 2

A hardened layer of cement, from about 1% to 50% of the thickness of an underlying structure, the hardened layer of cement having an SiOC ceramic black pigment and having a uniform color distribution through the layer of cement.

Example 3

In the cement structure of Example 1, or the cement layer of Example 2, the pigment has a particle size of less than about 1.5 μm.

Example 4

In the cement structure of Example 1, or the cement layer of Example 2, the pigment has a particle size of about 1.0 μm.

Example 5

In the cement structure of Example 1, or the cement layer of Example 2, the pigment has a particle size $D_{50}$ of from about 1 μm to a 0.1 μm.

Example 6

The cement structure of Example 1, or the cement layer of Example 2, has a primary particle $D_{50}$ size of from about 0.1 μm to about 2.0 μm.

Example 7

The cement structure of Example 1, or the cement layer of Example 2, has a primary particle $D_{50}$ size of from about 0.1 μm to about 2.0 μm.

Example 8

The cement structures or the cement layers of Examples 1-7, defining a blackness selected from the group consisting of: PMS 433, Black 3, Black 3, Black 4, Black 5, Black 6, Black 7, Black 2 2×, Black 3 2×, Black 4 2×, Black 5 2×, Black 6 2×, and Black 7 2×.

Example 9

The cement structures or the cement layers of Examples 1-7, defining a blackness selected from the group consisting of: Tri-stimulus Colorimeter of X from about 0.05 to about 3.0, Y from about 0.05 to about 3.0, and Z from about 0.05 to about 3.0; a CIE L a b of L of less than about 40; a CIE L a b of L of less about 20; a CIE L a b of L of less than 50, b of less than 1.0 and a of less than 2.

Example 10

The cement structures or the cement layers of Examples 1-7, defining a jetness value of at least about 200 $M_y$.

Example 11

The cement structures or the cement layers of Examples 1-7, wherein the structure is essentially free of heavy metals; wherein the structure has less than about 100 ppm of heavy metals; wherein the structure has less than about 10 ppm heavy metals; wherein the structure has less than about 1 ppm heavy metals; and wherein the structure has less than about 0.1 ppm heavy metals;

Example 12

The cement structure of Example 1, or the cement layer of Example 2, has a primary particle $D_{50}$ size of from about 0.1 μm to about 2.0 μm.

Example 13

The cement structure of Example 1, or the cement layer of Example 2, has a primary particle $D_{50}$ size of from about 0.1 µm to about 2.0 µm.

Example 14

The cement structures or the cement layers of Examples 1-7, having 7% SiOC pigment to cement, and the pigment having about 20% to about 65% Si, can have about 5% to about 50% 0, and can have about 3% to about 55% carbon weight percent and of the carbon present about 50% to about 79% is free carbon.

Example 15

The cement structures or the cement layers of Examples 1-7, having 8% SiOC pigment to cement, and the pigment having about 20% to about 65% Si, can have about 5% to about 50% 0, and can have about 3% to about 55% carbon weight percent and of the carbon present about 50% to about 79% is free carbon.

Example 17

The cement structures or the cement layers of Examples 1-7, having 12% SiOC pigment to cement, and the pigment having about 20% to about 65% Si, can have about 5% to about 50% 0, and can have about 3% to about 55% carbon weight percent and of the carbon present about 50% to about 79% is free carbon.

Example 18

A hardened concrete structure, such as for example, a driveway, a floor, a counter top, a paver, a pillar, a road, a cross-member, or a wall, having an SiOC ceramic black pigment and having uniform color distribution throughout the cement structure.

Example 19

A hardened layer of concrete, from about 1% to about 50% of the thickness of an underlying structure, the hardened layer of cement having an SiOC ceramic black pigment and having a uniform color distribution through the layer of cement.

Example 20

In the concrete structure of Example 18, or the concrete layer of Example 19, the pigment has a particle size of less than about 1.5 µm.

Example 21

In the concrete structure of Example 18, or the concrete layer of Example 19, the pigment has a particle size of about 1.0 µm.

Example 22

In the cement structure of Example 18, or the cement layer of Example 19, the pigment has a particle size $D_{50}$ of from about 1 µm to a 0.1 µm.

Example 23

The concrete structure of Example 18, or the concrete layer of Example 19, has a primary particle $D_{50}$ size of from about 0.1 µm to about 2.0 µm.

Example 24

The concrete structure of Example 18, or the concrete layer of Example 19, has a primary particle $D_{50}$ size of from about 0.1 µm to about 2.0 µm.

Example 25

The concrete structures or the concrete layers of Examples 18-24, defining a blackness selected from the group consisting of: PMS 433, Black 3, Black 3, Black 4, Black 5, Black 6, Black 7, Black 2 2×, Black 3 2×, Black 4 2×, Black 5 2×, Black 6 2×, and Black 7 2×.

Example 26

The concrete structures or the concrete layers of Examples 18-24, defining a blackness selected from the group consisting of: Tri-stimulus Colorimeter of X from about 0.05 to about 3.0, Y from about 0.05 to about 3.0, and Z from about 0.05 to about 3.0; a CIE L a b of L of less than about 40; a CIE L a b of L of less about 20; a CIE L a b of L of less than 50, b of less than 1.0 and a of less than 2.

Example 27

The concrete structures or the concrete layers of Examples 18-24, defining a jetness value of at least about 200 $M_y$.

Example 28

The concrete structures or the concrete layers of Examples 18-24, wherein the structure is essentially free of heavy metals; wherein the structure has less than about 100 ppm of heavy metals; wherein the structure has less than about 10 ppm heavy metals; wherein the structure has less than about 1 ppm heavy metals; and wherein the structure has less than about 0.1 ppm heavy metals;

Example 29

The concrete structure of Example 18, or the cement layer of Example 19, has a primary particle $D_{50}$ size of from about 0.1 µm to about 2.0 µm.

Example 30

The concrete structures of Example 18, or the cement layer of Example 19, has a primary particle $D_{50}$ size of from about 0.1 µm to about 2.0 µm.

Example 31

The concrete structures or the concrete layers of Examples 18-24, having 7% SiOC pigment to cement, and the pigment having about 20% to about 65% Si, can have about 5% to about 50% 0, and can have about 3% to about 55% carbon weight percent and of the carbon present about 50% to about 79% is free carbon.

Example 32

The concrete structures or the concrete layers of Examples 18-24, having 8% SiOC pigment to cement, and the pigment having about 20% to about 65% Si, can have about 5% to about 50% 0, and can have about 3% to about 55% carbon weight percent and of the carbon present about 50% to about 79% is free carbon.

Example 33

The concrete structures or the concrete layers of Examples 18-24, having 12% SiOC pigment to cement, and the pigment having about 20% to about 65% Si, can have about 5% to about 50% 0, and can have about 3% to about 55% carbon weight percent and of the carbon present about 50% to about 79% is free carbon.

Example 34

A portland cement, as specified in ASTM C150, Type I (normal), II (moderate sulfate resistance), II ("MH", moderate heat of hydration, and moderate sulfate resistance), III (high early strength), IV (low heat of hydration), or V (high sulfate resistance), having 8% to 15% of a ceramic black polysilocarb pigment of the type described in this specification.

Example 34

A blended hydraulic cement, as specified in ASTM C595, Type IL (portland-limestone cement), IS (portland-slag cement), IP (portland-pozzonlan cement), IT, (ternary blended cement) IV, or V having 8% to 15% of a ceramic black polysilocarb pigment of the type described in this specification.

Overview—Polysilocarb Formulations, Methods & Materials

Formulations, processes, methods of making, and compositions for various polysilocarbs are taught and disclosed in U.S. Pat. Nos. 9,499,677, 9,481,781 and US Patent Publication Nos. 2014/0274658, 2014/0323364, 2015/0175750, 2016/0207782, 2016/0280607, 2017/0050337, the entire disclosure of each of which are incorporated herein by reference.

General Processes for Obtaining a Polysilocarb Precursor

Typically, polymer derived ceramic precursor formulations, and in particular, polysilocarb precursor formulations, can generally be made by three types of processes, although other processes, and variations and combinations of these processes may be utilized. These processes generally involve combining precursors to form a precursor formulation. One type of process generally involves the mixing together of precursor materials in preferably a solvent free process with essentially no chemical reactions taking place, e.g., "the mixing process." The other type of process generally involves chemical reactions, e.g., "the reaction type process," to form specific, e.g., custom, precursor formulations, which could be monomers, dimers, trimers and polymers. A third type of process has a chemical reaction of two or more components in a solvent free environment, e.g., "the reaction blending type process." Generally, in the mixing process essentially all, and preferably all, of the chemical reactions take place during subsequent processing, such as during curing, pyrolysis and both.

It should be understood that these terms—reaction type process, reaction blending type process, and the mixing type process—are used for convenience and as a short hand reference. These terms, i.e., process types, are not, and should not be viewed as, limiting. For example, the reaction type process can be used to create a precursor material that is then used in the mixing type process with another precursor material.

These process types are described in this specification, among other places, under their respective headings. It should be understood that the teachings for one process, under one heading, and the teachings for the other processes, under the other headings, can be applicable to each other, as well as, being applicable to other sections, embodiments and teachings in this specification, and vice versa. The starting or precursor materials for one type of process may be used in the other type of processes. Further, it should be understood that the processes described under these headings should be read in context with the entirely of this specification, including the various examples and embodiments.

It should be understood that combinations and variations of these processes may be used in reaching a precursor formulation, and in reaching intermediate, end, and final products. Depending upon the specific process and desired features of the product, the precursors and starting materials for one process type can be used in the other. A formulation from the mixing type process may be used as a precursor, or component in the reaction type process, or the reaction blending type process. Similarly, a formulation from the reaction type process may be used in the mixing type process and the reaction blending process. Similarly, a formulation from the reaction blending type process may be used in the mixing type process and the reaction type process. Thus, and preferably, the optimum performance and features from the other processes can be combined and utilized to provide a cost effective and efficient process and end product. These processes provide great flexibility to create custom features for intermediate, end, and final products, and thus, any of these processes, and combinations of them, can provide a specific predetermined product. In selecting which type of process is preferable, factors such as cost, controllability, shelf life, scale up, manufacturing ease, etc., can be considered.

The precursor formulations may be used to form a "neat" material (by "neat" material it is meant that all, and essentially all of the structure is made from the precursor material or unfilled formulation; and thus, for example, there are no fillers or reinforcements). The precursor formulations may be used to form a filled material, e.g., having an additive or other material in addition to the precursors. They may be used to form composite materials, e.g., structures or coatings having other materials such as reinforcements in them. They may be used to form non-reinforced materials, which are materials that are made of primarily, essentially, and preferably only from the precursor materials, e.g., minimally filled materials where the filler is not intended to add or enhance strength, and unfilled materials. They may be sued to form reinforced materials, for example materials having fibers or other materials to add strength, abrasion resistance, durability, or other features or properties, that generally are viewed as strength related in a broad sense.

In general, types of filler material include, for example: inert fillers, such as inorganic materials that do not react with the SiOC matrix during curing, pyrolysis or use; reactive fillers, such as zirconium, aluminum hydroxide, and boron compounds that react with the SiOC matrix during curing, pyrolysis, use, or combinations of these; and, active fillers, such as materials that are released during the use of the end product to provide specific features to that product, e.g., lubricant. A filler may come under more than one of these types.

The filler material may also be made from, or derived from the same material as the formulation that has been formed into a cured or pyrolized solid, or it may be made from a different precursor formulation material, which has been formed into a cured solid or semi-solid, or pyrolized solid.

The polysilocarb formulation and products derived or made from that formulation may have metals and metal complexes. Thus, metals as oxides, carbides or silicides can be introduced into precursor formulations, and thus into a silica matrix in a controlled fashion. For example, organometallic, metal halide (chloride, bromide, iodide), metal alkoxide and metal amide compounds of transition metals can be copolymerized in the silica matrix, through incorporation into a precursor formulation.

The filler material can impart, regulate or enhance, features and properties, for example, electrical resistance, magnetic capabilities, band gap features, p-n junction features, p-type features, n-type features, dopants, electrical conductivity, semiconductor features, anti-static, optical properties (e.g., reflectivity, refractivity and iridescence), chemical resistivity, corrosion resistance, wear resistance, abrasions resistance, thermal insulation, UV stability, UV protective, and other features or properties that may be desirable, necessary, and both, in the end product or material.

Thus, filler materials could include copper lead wires, thermal conductive fillers, electrically conductive fillers, lead, optical fibers, ceramic colorants, pigments, oxides, dyes, powders, ceramic fines, polymer derived ceramic particles, pore-formers, carbosilanes, silanes, silazanes, silicon carbide, carbosilazanes, siloxane, metal powders, ceramic powders, metals, metal complexes, carbon, tow, fibers, staple fibers, boron containing materials, milled fibers, glass, glass fiber, fiber glass, and nanostructures (including nanostructures of the forgoing) to name a few. For example, crushed, polymer derived ceramic particles, e.g., fines or beads, can be added to a polysilocarb formulation and then cured to form a filled cured plastic material, which has significant fire resistant properties as a coating or in a device or component of a device.

The polysilocarb precursor formulations may be used with reinforcing materials to form composite layers or coatings. Thus, for example, the formulation may be flowed into, impregnated into, absorbed by or otherwise combined with a thin reinforcing material, such as carbon fibers, glass fiber, woven fabric, non-woven fabric, copped fibers, fibers, rope, braided structures, ceramic powders, glass powders, carbon powders, graphite powders, ceramic fibers, metal powders, carbide pellets or components, staple fibers, tow, nanostructures of the above, PDCs, any other material that meets the temperature requirements of the process and end product, and combinations and variations of these. Thus, for example, the reinforcing materials may be any of the high temperature resistant reinforcing materials currently used, or capable of being used with, existing plastics and ceramic composite materials. Additionally, because the polysilocarb precursor formulation may be formulated for a lower temperature cure (e.g., SATP) or a cure temperature of for example about 37.8° C. (100° F.) to about 204.4° C. (400° F.), the reinforcing material may be polymers, organic polymers, such as nylons, polypropylene, and polyethylene, as well as aramid fibers, such as NOMEX or KEVLAR.

The reinforcing material may also be made from, or derived from the same material as the formulation that has been formed into a fiber, cured into a solid, pyrolized into a ceramic, or it may be made from a different precursor formulation material, which has been formed into a fiber, pyrolized into a ceramic and combinations and variations of these. In addition to ceramic fibers derived from the precursor formulation materials that may be used as reinforcing material, other porous, substantially porous, and non-porous ceramic structures derived from a precursor formulation material may be used.

The polysilocarb material (e.g., precursor batch, precursor, formulation, bulk liquid, etc.), can have various inhibitors, catalysts and initiator present that inhibit, regulate, or promote curing, under predetermined conditions. Thus, the polysilocarb coating material can have sufficient inhibitors present, or the absence of a catalyst, to provide the required shelf life for the material in storage.

The Mixing Type Process

Precursor materials may be a methyl hydrogen (methyl terminated hydride substituted polysiloxane), methyl hydrogen fluid (methyl terminated hydride methyl substitute polysiloxane, with little to no dimethyl groups) and substituted and modified methyl hydrogens, siloxane backbone materials, siloxane backbone additives, reactive monomers, reaction products of a siloxane backbone additive with a silane modifier or an organic modifier, and other similar types of materials, such as silane based materials, silazane based materials, carbosilane based materials, non-silicon based organic cross linkers, phenol/formaldehyde based materials, and combinations and variations of these. The precursors are preferably liquids at room temperature, although they may be solids that are melted, or that are soluble in one of the other precursors. (In this situation, however, it should be understood that when one precursor dissolves another, it is nevertheless not considered to be a "solvent" as that term is used with respect to the prior art processes that employ non-constituent solvents, e.g., solvents that do not form a part or component of the end product, are treated as waste products, and both.)

The precursors are mixed together in a vessel, preferably at room temperature. Preferably, little, and more preferably no solvents, e.g., water, organic solvents, polar solvents, non-polar solvents, hexane, THF, toluene, are added to this mixture of precursor materials. Preferably, each precursor material is miscible with the others, e.g., they can be mixed at any relative amounts, or in any proportions, and will not separate or precipitate. At this point the "precursor mixture" or "polysilocarb precursor formulation" is compete (noting that if only a single precursor is used the material would simply be a "polysilocarb precursor" or a "polysilocarb precursor formulation" or a "formulation"). Although complete, fillers and reinforcers may be added to the formulation. In preferred embodiments of the formulation, essentially no, and more preferably no chemical reactions, e.g., crosslinking or polymerization, takes place within the formulation, when the formulation is mixed, or when the formulation is being held in a vessel, on a prepreg, or over a time period, prior to being cured.

The precursors can be mixed under numerous types of atmospheres and conditions, e.g., air, inert, $N_2$, Argon, flowing gas, static gas, reduced pressure, elevated pressure, ambient pressure, and combinations and variations of these.

Additionally, inhibitors such as cyclohexane, 1-Ethynyl-1-cyclohexanol (which may be obtained from ALDRICH), Octamethylcyclotetrasiloxane (which may be viewed as a dilutant), and tetramethyltetravinylcyclotetrasiloxane, may be added to the polysilocarb precursor formulation, e.g., to form an inhibited polysilocarb precursor formulation. It should be noted that tetramethyltetravinylcyclotetrasiloxane may act as both a reactant and a reaction retardant (e.g., an inhibitor), depending upon the amount present and temperature, e.g., at room temperature it is a retardant and at elevated temperatures it is a reactant. Other materials, as well, may be added to the polysilocarb precursor formulation, e.g., a filled polysilocarb precursor formulation, at this point in processing, including fillers such as SiC powder, carbon black, sand, polymer derived ceramic particles, pigments, particles, nano-tubes, whiskers, or other materials, discussed in this specification or otherwise known to the arts. Further, a formulation with both inhibitors and fillers would be considered an inhibited, filled polysilocarb precursor formulation.

A catalyst or initiator may be used, and can be added at the time of, prior to, shortly before, or at an earlier time before the precursor formulation is formed or made into a structure, prior to curing. The catalysis assists in, advances, and promotes the curing of the precursor formulation to form a cured material or structure.

The catalyst can be any platinum (Pt) based catalyst, which can, for example, be diluted to ranges of: about 0.01 parts per million (ppm) Pt to about 250 ppm Pt, about 0.03 ppm Pt, about 0.1 ppm Pt, about 0.2 ppm Pt, about 0.5 ppm Pt, about 0.02 to 0.5 ppm Pt, about 1 ppm to 200 ppm Pt and preferably, for some applications and embodiments, about 5 ppm to 50 ppm Pt. The catalyst can be a peroxide based catalyst with, for example, a 10 hour half life above 90 C at a concentration of between 0.1% to 3% peroxide, and about 0.5% and 2% peroxide. It can be an organic based peroxide. It can be any organometallic catalyst capable of reacting with Si—H bonds, Si—OH bonds, or unsaturated carbon bonds, these catalysts may include: dibutyltin dilaurate, zinc octoate, peroxides, organometallic compounds of for example titanium, zirconium, rhodium, iridium, palladium, cobalt or nickel. Catalysts may also be any other rhodium, rhenium, iridium, palladium, nickel, and ruthenium type or based catalysts. Combinations and variations of these and other catalysts may be used. Catalysts may be obtained from ARKEMA under the trade name LUPEROX, e.g., LUPEROX 231; and from Johnson Matthey under the trade names: Karstedt's catalyst, Ashby's catalyst, Speier's catalyst. Transition metal catalysis, such as Fe catalysis, Ni catalysis, and Co catalysis, that for example are used in the growth of ordered and highly ordered carbon structures, such as carbon nanotubes, can also be used.

Further, custom and specific combinations of these and other catalysts may be used, such that they are matched to specific formulations, and in this way selectively and specifically catalyze the reaction of specific constituents. Moreover, the use of these types of matched catalyst—formulations systems, as well as, process conditions, may be used to provide predetermined product features, such as for example, pore structures, porosity, densities, density profiles, high purity, ultra high purity, and other morphologies or features of cured structures or materials, and in some instances the ceramics that are formed from the cured structures or materials.

In this mixing type process for making a precursor formulation, preferably chemical reactions or molecular rearrangements only take place during the making of the raw starting materials, the curing process, and in the pyrolizing process. Preferably, in the embodiments of these mixing type of formulations and processes, polymerization, cross-linking or other chemical reactions take place primarily, preferably essentially, and more preferably solely during the curing process.

The precursor may be a methyl terminated hydride substituted polysiloxane, which can be referred to herein as methyl hydrogen (MH), having the formula shown below.

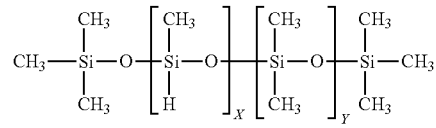

The MH, for example, may have a molecular weight ("mw" which can be measured as weight averaged molecular weight in amu or as g/mol) from about 400 mw to about 10,000 mw, from about 600 mw to about 3,000 mw, and may have a viscosity preferably from about 20 cps to about 60 cps. The percentage of methylsiloxane units "X" may be from 1% to 100%. The percentage of the dimethylsiloxane units "Y" may be from 0% to 99%. This precursor may be used to provide the backbone of the cross-linked structures, as well as, other features and characteristics to the cured preform and ceramic material. This precursor may also, among other things, be modified by reacting with unsaturated carbon compounds to produce new, or additional, precursors. Typically, methyl hydrogen fluid (MHF) has minimal amounts of "Y", and more preferably "Y" is for all practical purposes zero.

The precursor may be any of the following linear siloxane backbone materials.

The precursor may be a vinyl substituted polydimethyl siloxane, which formula is shown below.

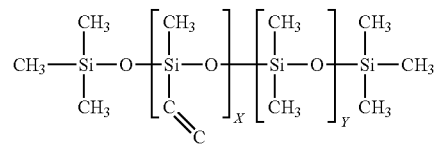

This precursor, for example, may have a molecular weight (mw) from about 400 mw to about 10,000 mw, and may have a viscosity preferably from about 50 cps to about 2,000 cps. The percentage of methylvinylsiloxane units "X" may be from 1% to 100%. The percentage of the dimethylsiloxane units "Y" may be from 0% to 99%. Preferably, X is about 100%. This precursor may be used to increase crosslink density and improve toughness, as well as, other features and characteristics to the cured preform and ceramic material.

The precursor may be a vinyl substituted and vinyl terminated polydimethyl siloxane, which formula is shown below.

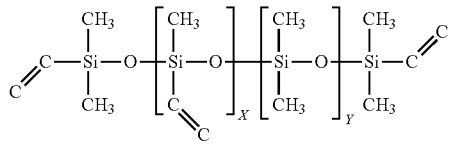

This precursor, for example, may have a molecular weight (mw) from about 500 mw to about 15,000 mw, and may preferably have a molecular weight from about 500 mw to 1,000 mw, and may have a viscosity preferably from about 10 cps to about 200 cps. The percentage of methylvinylsiloxane units "X" may be from 1% to 100%. The percentage of the dimethylsiloxane units "Y" may be from 0% to 99%. This precursor may be used to provide branching and decrease the cure temperature, as well as, other features and characteristics to the cured preform and ceramic material.

The precursor may be a vinyl substituted and hydrogen terminated polydimethyl siloxane, which formula is shown below.

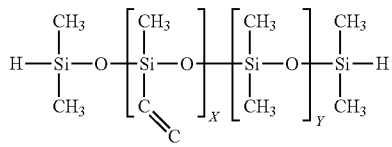

This precursor may have a molecular weight (mw) from about 300 mw to about 10,000 mw, and may preferably have a molecular weight from about 400 mw to 800 mw, and may have a viscosity preferably from about 20 cps to about 300 cps. The percentage of methylvinylsiloxane units "X" may be from 1% to 100%. The percentage of the dimethylsiloxane units "Y" may be from 0% to 99%. This precursor may be used to provide branching and decrease the cure temperature, as well as, other features and characteristics to the cured preform and ceramic material.

The precursor may be an allyl terminated polydimethyl siloxane, which formula is shown below.

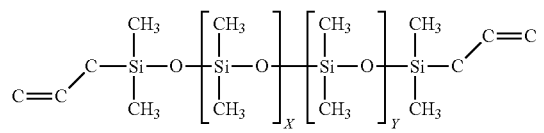

This precursor may have a molecular weight (mw) from about 400 mw to about 10,000 mw, and may have a viscosity preferably from about 40 cps to about 400 cps. The repeating units are the same. This precursor may be used to provide UV curability and to extend the polymeric chain, as well as, other features and characteristics to the cured preform and ceramic material.

The precursor may be a vinyl terminated polydimethyl siloxane (VT), which formula is shown below.

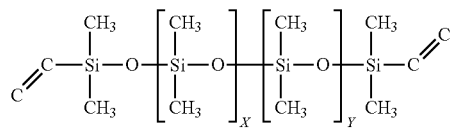

This precursor may have a molecular weight (mw) from about 200 mw to about 5,000 mw, and may preferably have a molecular weight from about 400 mw to 1,500 mw, and may have a viscosity preferably from about 10 cps to about 400 cps. The repeating units are the same. This precursor may be used to provide a polymeric chain extender, improve toughness and to lower cure temperature down to for example room temperature curing, as well as, other features and characteristics to the cured preform and ceramic material.

The precursor may be a silanol (hydroxy) terminated polydimethyl siloxane, which formula is shown below.

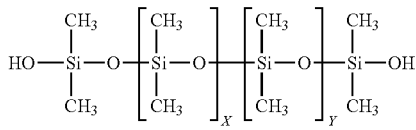

This precursor may have a molecular weight (mw) from about 400 mw to about 10,000 mw, and may preferably have a molecular weight from about 600 mw to 1,000 mw, and may have a viscosity preferably from about 30 cps to about 400 cps. The repeating units are the same. This precursor may be used to provide a polymeric chain extender, a toughening mechanism, can generate nano- and micro-scale porosity, and allows curing at room temperature, as well as other features and characteristics to the cured preform and ceramic material.

The precursor may be a silanol (hydroxy) terminated vinyl substituted dimethyl siloxane, which formula is shown below.

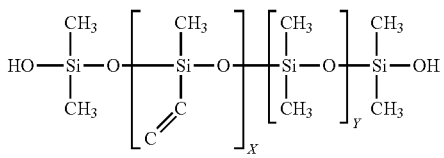

This precursor may have a molecular weight (mw) from about 400 mw to about 10,000 mw, and may preferably have a molecular weight from about 600 mw to 1,000 mw, and may have a viscosity preferably from about 30 cps to about 400 cps. The percentage of methylvinylsiloxane units "X" may be from 1% to 100%. The percentage of the dimethylsiloxane units "Y" may be from 0% to 99%. This precursor may be used, among other things, in a dual-cure system; in this manner the dual-cure can allow the use of multiple cure mechanisms in a single formulation. For example, both condensation type cure and addition type cure can be utilized. This, in turn, provides the ability to have complex cure profiles, which for example may provide for an initial cure via one type of curing and a final cure via a separate type of curing.

The precursor may be a hydrogen (hydride) terminated polydimethyl siloxane, which formula is shown below.

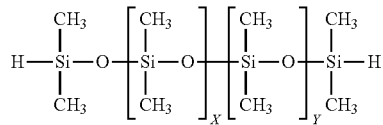

This precursor may have a molecular weight (mw) from about 200 mw to about 10,000 mw, and may preferably have a molecular weight from about 500 mw to 1,500 mw, and may have a viscosity preferably from about 20 cps to about 400 cps. The repeating units are the same. This precursor may be used to provide a polymeric chain extender, as a toughening agent, and it allows lower temperature curing, e.g., room temperature, as well as other features and characteristics to the cured preform and ceramic material.

The precursor may be a di-phenyl terminated siloxane (which may also be referred to as phenyl terminated), which formula is shown below.

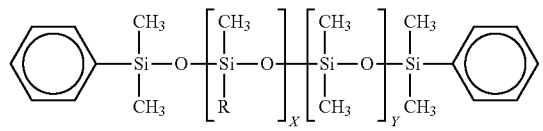

Where here R is a reactive group, such as vinyl, hydroxy, or hydride. This precursor may have a molecular weight (mw) from about 500 mw to about 2,000 mw, and may have a viscosity preferably from about 80 cps to about 300 cps. The percentage of methyl-R-siloxane units "X" may be from 1% to 100%. The percentage of the dimethylsiloxane units "Y" may be from 0% to 99%. This precursor may be used to provide a toughening agent, and to adjust the refractive index of the polymer to match the refractive index of various types of glass, to provide for example transparent fiberglass, as well as, other features and characteristics to the cured preform and ceramic material.

The precursor may be a mono-phenyl terminated siloxane (which may also be referred to as trimethyl terminated, phenyl terminated siloxane), which formulas are shown below.

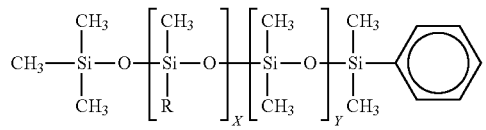

Where R is a reactive group, such as vinyl, hydroxy, or hydride. This precursor may have a molecular weight (mw) from about 500 mw to about 2,000 mw, and may have a viscosity preferably from about 80 cps to about 300 cps. The percentage of methyl-R-siloxane units "X" may be from 1% to 100%. The percentage of the dimethylsiloxane units "Y" may be from 0% to 99%. This precursor may be used to provide a toughening agent and to adjust the refractive index of the polymer to match the refractive index of various types of glass, to provide for example transparent fiberglass, as well as, other features and characteristics to the cured preform and ceramic material.

The precursor may be a diphenyl dimethyl polysiloxane, which formula is shown below.

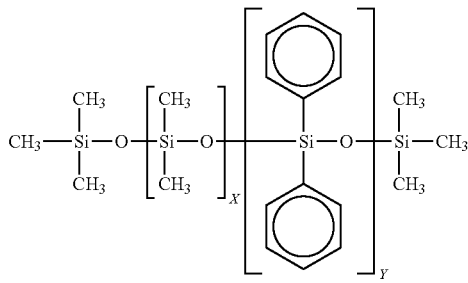

This precursor may have a molecular weight (mw) from about 500 mw to about 20,000 mw, and may have a molecular weight from about 800 to about 4,000, and may have a viscosity preferably from about 100 cps to about 800 cps. The percentage of dimethylsiloxane units "X" may be from 25% to 95%. The percentage of the diphenyl siloxane units "Y" may be from 5% to 75%. This precursor may be used to provide similar characteristics to the mono-phenyl terminated siloxane, as well as, other features and characteristics to the cured preform and ceramic material.

The precursor may be a vinyl terminated diphenyl dimethyl polysiloxane, which formula is shown below.

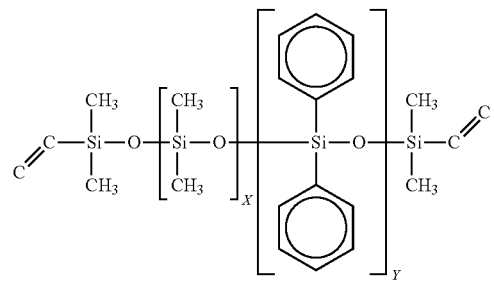

This precursor may have a molecular weight (mw) from about 400 mw to about 20,000 mw, and may have a molecular weight from about 800 to about 2,000, and may have a viscosity preferably from about 80 cps to about 600 cps. The percentage of dimethylsiloxane units "X" may be from 25% to 95%. The percentage of the diphenyl siloxane units "Y" may be from 5% to 75%. This precursor may be used to provide chain extension, toughening agent, changed or altered refractive index, and improvements to high temperature thermal stability of the cured material, as well as, other features and characteristics to the cured preform and ceramic material.

The precursor may be a hydroxy terminated diphenyl dimethyl polysiloxane, which formula is shown below.

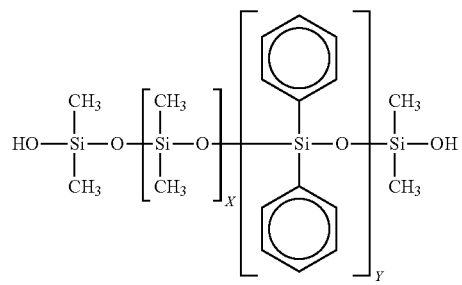

This precursor may have a molecular weight (mw) from about 400 mw to about 20,000 mw, and may have a molecular weight from about 800 to about 2,000, and may have a viscosity preferably from about 80 cps to about 400 cps. The percentage of dimethylsiloxane units "X" may be from 25% to 95%. The percentage of the diphenyl siloxane units "Y" may be from 5% to 75%. This precursor may be used to provide chain extension, toughening agent, changed or altered refractive index, and improvements to high temperature thermal stability of the cured material, can generate nano- and micro-scale porosity, as well as other features and characteristics to the cured preform and ceramic material.

This precursor may be a methyl terminated phenylethyl polysiloxane, (which may also be referred to as styrene vinyl benzene dimethyl polysiloxane), which formula is shown below.

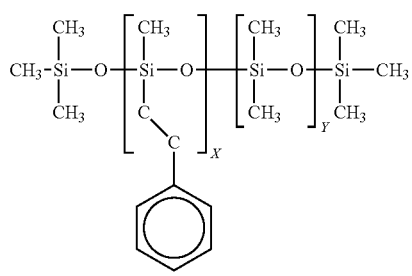

This precursor may have a molecular weight (mw) may be from about 800 mw to at least about 10,000 mw to at least about 20,000 mw, and may have a viscosity preferably from about 50 cps to about 350 cps. The percentage of styrene vinyl benzene siloxane units "X" may be from 1% to 60%. The percentage of the dimethylsiloxane units "Y" may be from 40% to 99%. This precursor may be used to provide improved toughness, decreases reaction cure exotherm, may change or alter the refractive index, adjust the refractive index of the polymer to match the refractive index of various types of glass, to provide for example transparent fiberglass, as well as, other features and characteristics to the cured preform and ceramic material.

The forgoing linear siloxane backbone materials, are by way of example, and it is understood that other similar linear siloxane backbone materials can also be used as precursors. More complex linear and branched siloxane backbone materials may be used as precursors, but are not preferred.

A variety of cyclosiloxanes can be used as precursors, and are reactive molecules, in the formulation. They can be described by the following nomenclature system or formula: $D_xD^*_y$, where "D" represents a dimethyl siloxy unit and "D*" represents a substituted methyl siloxy unit, where the "*" group could be vinyl, allyl, hydride, hydroxy, phenyl, styryl, alkyl, cyclopentadienyl, or other organic group, x is from 0-8, y is >=1, and x+y is from 3-8. Further, in this nomenclature system—D represents —$SiO_2$ groups, typically $Me_2SiO_2$, Q represents Sat, T represents —$SiO_3$ groups, typically $MeSiO_3$ and M represent —SiO groups, typically $Me_3SiO$.

The precursor batch may also: (i) contain non-silicon based precursors, such as non-silicon based cross-linking agents; (ii) be the reaction product of a non-silicon based cross linking agent and a silicon based precursor; and, (iii) combinations and variation of these. The non-silicon based cross-linking agents are intended to, and provide, the capability to cross-link during curing. For example, non-silicon based cross-linking agents include: cyclopentadiene (CP), methylcyclopentadiene (MeCP), dicyclopentadiene (DCPD), methyldicyclopentadiene (MeDCPD), tricyclopentadiene (TCPD), piperylene, divnylbenzene, isoprene, norbornadiene, vinylnorbornene, propenylnorbornene, isopropenylnorbornene, methylvinylnorbornene, bicyclononadiene, methylbicyclononadiene, propadiene, 4-vinylcyclohexene, 1,3-heptadiene, cycloheptadiene, 1,3-butadiene, cyclooctadiene and isomers thereof. Generally, any hydrocarbon that contains two (or more) unsaturated, C=C, bonds that can react with a Si—H, or other Si bond in a precursor, can be used as a cross-linking agent. Some organic materials containing oxygen, nitrogen, and sulphur may also function as cross-linking agents.

The amount of the non-silicon based cross-linking agent to the silicon based precursor can be from about 10% to 90% non-silicon based cross-linker to 10% to 90% silicon based precursor (preferably a silicon backbone, e.g., —Si—O— backbone, material). Thus, the ranges of amounts can be, for example: DCPD/MHF from 10/90 to 90/10, about 40/60 to 60/40, about 50/50, and combinations and variations of these ratios, as well as other ratios. A third and fourth precursor material may also be used. Thus, the ratio of non-silicon cross linker/silicon backbone precursor/third precursor, can be: form about 10% to about 80% non-silicon based cross linker; from about 10% to 80% silicon based precursor: and form about 0.1% to 40% third precursor. The ranges and amounts can be, for example: DCPD/MHF/3rd precursor from about 10/20/70 to 70/20/10, from about 10/20/70 to 10/70/20, from about 45/55/10 to about 55/45/10, from about 40/55/5 to about 55/40/5 and combinations and variations of these ratios as well as other ratios.

The precursor may be a reactive monomer. These would include molecules, such as tetramethyltetravinylcyclotetrasiloxane (TV), which formula is shown below.

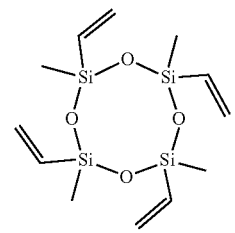 [SMILES: C=C[Si]1(C)O[Si](C)(C=C)O[Si](C)(C=C)O[Si](C)(C=C)O1]

This precursor may be used to provide a branching agent, a three-dimensional cross-linking agent, as well as, other features and characteristics to the cured preform and ceramic material. (It is also noted that in certain formulations, e.g., above 2%, and certain temperatures, e.g., about from about room temperature to about 60° C., this precursor may act as an inhibitor to cross-linking, e.g., in may inhibit the cross-linking of hydride and vinyl groups.)

The precursor may be a reactive monomer, for example, such as trivinyl cyclotetrasiloxane,

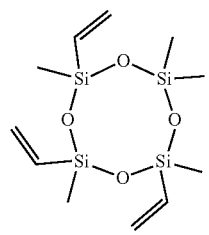 [SMILES: C=C[Si]1(C)O[Si](C)(C)O[Si](C)(C=C)O[Si](C)(C=C)O1]

divinyl cyclotetrasiloxane,

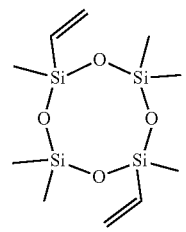

trivinyl monohydride cyclotetrasiloxane,

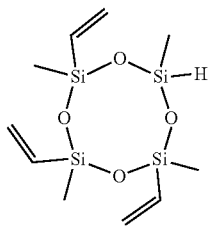 [SMILES: C=C[Si]1(C)O[SiH](C)O[Si](C)(C=C)O[Si](C)(C=C)O1]

divinyl dihydride cyclotetrasiloxane,

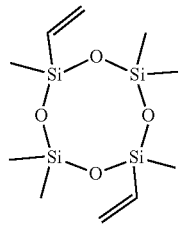

and a hexamethyl cyclotetrasiloxane, such as,

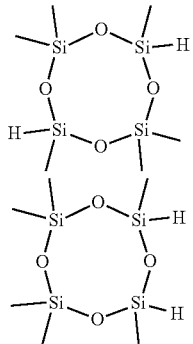

The precursor may be a silane modifier, such as vinyl phenyl methylsilane, diphenylsilane, diphenylmethylsilane, and phenylmethylsilane (some of which may be used as an end capper or end termination group). These silane modifiers can provide chain extenders and branching agents. They also improve toughness, alter refractive index, and improve high temperature cure stability of the cured material, as well as improving the strength of the cured material, among other things. A precursor, such as diphenylmethylsilane, may function as an end capping agent, that may also improve toughness, alter refractive index, and improve high temperature cure stability of the cured material, as well as, improving the strength of the cured material, among other things.

The precursor may be a reaction product of a silane modifier with a vinyl terminated siloxane backbone additive. The precursor may be a reaction product of a silane modifier with a hydroxy terminated siloxane backbone additive. The precursor may be a reaction product of a silane modifier with a hydride terminated siloxane backbone additive. The precursor may be a reaction product of a silane modifier with TV. The precursor may be a reaction product of a silane. The precursor may be a reaction product of a silane modifier with a cyclosiloxane, taking into consideration steric hindrances.

The precursor may be a partially hydrolyzed tertraethyl orthosilicate, such as TES 40 or Silbond 40. The precursor may also be a methylsesquisiloxane such as SR-350 available from Momentive (previously from General Electric Company, Wilton, Conn.). The precursor may also be a phenyl methyl siloxane such as 604 from Wacker Chemie AG. The precursor may also be a methylphenylvinylsiloxane, such as H62 C from Wacker Chemie AG.

The precursors may also be selected from the following: SiSiB® HF2020, TRIMETHYLSILYL TERMINATED METHYL HYDROGEN SILICONE FLUID 63148-57-2; SiSiB® HF2050 TRIMETHYLSILYL TERMINATED METHYLHYDROSILOXANE DIMETHYLSILOXANE COPOLYMER 68037-59-2; SiSiB® HF2060 HYDRIDE TERMINATED METHYLHYDROSILOXANE DIMETHYLSILOXANE COPOLYMER 69013-23-6; SiSiB® HF2038 HYDROGEN TERMINATED POLYDIPHENYL SILOXANE; SiSiB® HF2068 HYDRIDE TERMINATED METHYLHYDROSILOXANE DIMETHYLSILOXANE COPOLYMER 115487-49-5; SiSiB® HF2078 HYDRIDE TERMINATED POLY(PHENYLDIMETHYLSILOXY) SILOXANE PHENYL SILSESQUIOXANE, HYDROGEN-TERMINATED 68952-30-7; SiSiB® VF6060 VINYLDIMETHYL TERMINATED VINYLMETHYL DIMETHYL POLYSILOXANE COPOLYMERS 68083-18-1; SiSiB® VF6862 VINYLDIMETHYL TERMINATED DIMETHYL DIPHENYL POLYSILOXANE COPOLYMER 68951-96-2; SiSiB® VF6872 VINYLDIMETHYL TERMINATED DIMETHYL-METHYLVINYL-DIPHENYL POLYSILOXANE COPOLYMER; SiSiB® PC9401 1,1,3,3-TETRAMETHYL-1,3-DIVINYLDISILOXANE 2627-95-4; SiSiB® PF1070 SILANOL TERMINATED POLYDIMETHYLSILOXANE (OF1070) 70131-67-8; SiSiB® OF1070 SILANOL TERMINATED POLYDIMETHYSILOXANE 70131-67-8; OH-ENDCAPPED POLYDIMETHYLSILOXANE HYDROXY TERMINATED OLYDIMETHYLSILOXANE 73138-87-1; SiSiB® VF6030 VINYL TERMINATED POLYDIMETHYL SILOXANE 68083-19-2; and, SiSiB® HF2030 HYDROGEN TERMINATED POLYDIMETHYLSILOXANE FLUID 70900-21-9.

Thus, in additional to the forgoing type of precursors, it is contemplated that a precursor may be a compound of the following general formula.

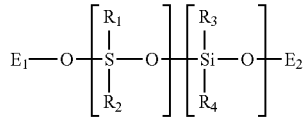

Wherein end cappers $E_1$ and $E_2$ are chosen from groups such as trimethylsiliy (trimethyl silicon) (—Si(CH$_3$)$_3$), dimethylsilyl hydroxy (dimethyl silicon hydroxy) (—Si(CH$_3$)$_2$OH), dimethylhydridosilyl (dimethyl silicon hydride) (—Si(CH$_3$)$_2$H), dimethylvinylsilyl (dimethyl vinyl silicon) (—Si(CH$_3$)$_2$(CH=CH$_2$)), dimethylphenylsily (—Si(CH$_3$)$_2$(C$_6$H$_5$)) and dimethylalkoxysilyl (dimethyl alkoxy silicon) (—Si(CH$_3$)$_2$(OR). The R groups $R_1$, $R_2$, $R_3$, and $R_4$ may all be different, or one or more may be the same. Thus, for example, $R_2$ is the same as $R_3$, $R_3$ is the same as $R_4$, $R_1$ and $R_2$ are different with $R_3$ and $R_4$ being the same, etc. The R groups are chosen from groups such as hydride (—H), methyl (Me)(—C), ethyl (—C≡C), vinyl (—C=C), alkyl (—R)(C$_n$H$_{2n+1}$), allyl (—C—C=C), aryl ('R), phenyl (Ph) (—C$_6$H$_5$), methoxy (—O—C), ethoxy (—O—C—C), siloxy (—O—Si—R$_3$), alkoxy (—O—R), hydroxy (—O—H), phenylethyl (—C—C—C$_6$H$_5$) and methyl,phenyl-ethyl (—C—C(—C)(—C$_6$H$_5$).

In general, embodiments of formulations for polysilocarb formulations may, for example, have from about 0% to 50% MHF, about 20% to about 99% MHF, about 0% to about 30% siloxane backbone material, about 20% to about 99% siloxane backbone materials, about 0% to about 70% reactive monomers, about 0% to about 95% TV, about 0% to about 70% non-silicon based cross linker, and, about 0% to about 90% reaction products of a siloxane backbone additives with a silane modifier or an organic modifier reaction product.

In mixing the formulations sufficient time should be used to permit the precursors to become effectively mixed and dispersed. Generally, mixing of about 15 minutes to an hour is sufficient. Typically, the precursor formulations are relatively, and essentially, shear insensitive, and thus the type of pumps or mixing are not critical. It is further noted that in higher viscosity formulations additional mixing time may be required. The temperature of the formulations, during mixing should preferably be kept below about 45° C., and preferably about 10° C. (It is noted that these mixing conditions are for the pre-catalyzed formulations.)

The Reaction Type Process

In the reaction type process, in general, a chemical reaction is used to combine one, two or more precursors, typically in the presence of a solvent, to form a precursor formulation that is essentially made up of a single polymer that can then be, catalyzed, cured and pyrolized. This process provides the ability to build custom precursor formulations that when cured can provide plastics having unique and desirable features. The cured materials can also be pyrolized to form ceramics having unique features. The reaction type process allows for the predetermined balancing of different types of functionality in the end product by selecting functional groups for incorporation into the polymer that makes up the precursor formulation, e.g., phenyls which typically are not used for ceramics but have benefits for providing high temperature capabilities for plastics, and styrene which typically does not provide high temperature features for plastics but provides benefits for ceramics.

In general a custom polymer for use as a precursor formulation is made by reacting precursors in a condensation reaction to form the polymer precursor formulation. This precursor formulation is then cured into a preform, i.e., plastic, cured solid or semi-solid material, through a hydrolysis reaction. The condensation reaction forms a polymer of the type shown below.

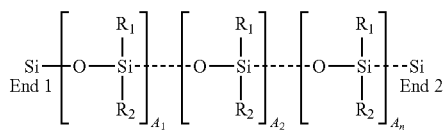

Where R$_1$ and R$_2$ in the polymeric units can be a hydride (—H), a methyl (Me)(—C), an ethyl (—C—C), a vinyl (—C═C), an alkyl (—R)(C$_n$H$_{2n+1}$), an unsaturated alkyl (—C$_n$H$_{2n-1}$), a cyclic alkyl (—C$_n$H$_{2n-1}$), an allyl (—C—C═C), a butenyl (—C$_4$H$_7$), a pentenyl (—C$_5$H$_9$), a cyclopentenyl (—C$_5$H$_7$), a methyl cyclopentenyl (—C$_5$H$_6$(CH$_3$)), a norbornenyl (—C$_X$H$_Y$, where X=7-15 and Y=9-18), an aryl ('R), a phenyl (Ph)(—C$_6$H$_5$), a cycloheptenyl (—C$_7$H$_{11}$), a cyclooctenyl (—C$_8$H$_{13}$), an ethoxy (—O—C—C), a siloxy (—O—Si—R$_3$), a methoxy (—O—C), an alkoxy, (—O—R), a hydroxy, (—O—H), a phenylethyl (—C—C—C$_6$H$_5$) a methyl,phenyl-ethyl (—C—C(—C)(—C$_6$H$_5$)) and a vinylphenyl-ethyl (—C—C(C$_6$H$_4$(—C═C))). R$_1$ and R$_2$ may be the same or different. The custom precursor polymers can have several different polymeric units, e.g., A$_1$, A$_2$, A$_n$, and may include as many as 10, 20 or more units, or it may contain only a single unit, for example, MHF made by the reaction process may have only a single unit.

Embodiments may include precursors, which include among others, a triethoxy methyl silane, a diethoxy methyl phenyl silane, a diethoxy methyl hydride silane, a diethoxy methyl vinyl silane, a dimethyl ethoxy vinyl silane, a diethoxy dimethyl silane. an ethoxy dimethyl phenyl silane, a diethoxy dihydride silane, a triethoxy phenyl silane, a diethoxy hydride trimethyl siloxane, a diethoxy methyl trimethyl siloxane, a trimethyl ethoxy silane, a diphenyl diethoxy silane, a dimethyl ethoxy hydride siloxane, and combinations and variations of these and other precursors, including other precursors set forth in this specification.

The end units, Si End 1 and Si End 2, can come from the precursors of dimethyl ethoxy vinyl silane, ethoxy dimethyl phenyl silane, and trimethyl ethoxy silane. Additionally, if the polymerization process is properly controlled a hydroxy end cap can be obtained from the precursors used to provide the repeating units of the polymer.

In general, the precursors are added to a vessel with ethanol (or other material to absorb heat, e.g., to provide thermal mass), an excess of water, and hydrochloric acid (or other proton source). This mixture is heated until it reaches its activation energy, after which the reaction typically is exothermic. Generally, in this reaction the water reacts with an ethoxy group of the silane of the precursor monomer, forming a hydroxy (with ethanol as the byproduct). Once formed this hydroxy becomes subject to reaction with an ethoxy group on the silicon of another precursor monomer, resulting in a polymerization reaction. This polymerization reaction is continued until the desired chain length(s) is built.

Control factors for determining chain length, among others, are: the monomers chosen (generally, the smaller the monomers the more that can be added before they begin to coil around and bond to themselves); the amount and point in the reaction where end cappers are introduced; and the amount of water and the rate of addition, among others. Thus, the chain lengths can be from about 180 mw (viscosity about 5 cps) to about 65,000 mw (viscosity of about 10,000 cps), greater than about 1000 mw, greater than about 10,000 mw, greater than about 50,000 mw and greater. Further, the polymerized precursor formulation may, and typically does, have polymers of different molecular weights, which can be predetermined to provide formulation, cured, and ceramic product performance features.

Upon completion of the polymerization reaction the material is transferred into a separation apparatus, e.g., a separation funnel, which has an amount of deionized water that, for example, is from about 1.2× to about 1.5× the mass of the material. This mixture is vigorously stirred for about less than 1 minute and preferably from about 5 to 30 seconds. Once stirred the material is allowed to settle and separate, which may take from about 1 to 2 hours. The polymer is the higher density material and is removed from the vessel. This removed polymer is then dried by either warming in a shallow tray at 90° C. for about two hours; or, preferably, is passed through a wiped film distillation apparatus, to remove any residual water and ethanol. Alternatively, sodium bicarbonate sufficient to buffer the aqueous layer to a pH of about 4 to about 7 is added. It is further understood that other, and commercial, manners of mixing, reacting and separating the polymer from the material may be employed.

Preferably a catalyst is used in the curing process of the polymer precursor formulations from the reaction type process. The same polymers, as used for curing the precursor formulations from the mixing type process can be used. It is noted that, generally unlike the mixing type formulations, a catalyst is not necessarily required to cure a reaction type polymer. Inhibitors may also be used. However, if a catalyst is not used, reaction time and rates will be slower. The curing and the pyrolysis of the cured material from the reaction process is essentially the same as the curing and pyrolysis of the cured material from the mixing process and the reaction blending process.

The reaction type process can be conducted under numerous types of atmospheres and conditions, e.g., air, inert, $N_2$, Argon, flowing gas, static gas, reduced pressure, ambient pressure, elevated pressure, and combinations and variations of these.

The Reaction Blending Type Process

In the reaction blending type process precursor are reacted to from a precursor formulation, in the absence of a solvent. For example, an embodiment of a reaction blending type process has a precursor formulation that is prepared from MHF and Dicyclopentadiene (DCPD). Using the reactive blending process a MHF/DCPD polymer is created and this polymer is used as a precursor formulation. It can be used alone to form a cured or pyrolized product, or as a precursor in the mixing or reaction processes.

Thus, for example, from about 40 to 90% MHF of known molecular weight and hydride equivalent mass; about 0.20 wt % P01 catalyst; and from about 10 to 60% DCPD with 83% purity, can be used.

P01 is a 2% Pt(0) tetravinylcyclotetrasiloxane complex in tetravinylcyclotetrasiloxane, diluted 20× with tetravinylcyclotetrasiloxane to 0.1% of Pt(0) complex. In this manner 10 ppm Pt is provided for every 1% loading of bulk cat.

In an embodiment of the process, a sealable reaction vessel, with a mixer, can be used for the reaction. The reaction is conducted in the sealed vessel, in air; although other types of atmosphere can be utilized. Preferably, the reaction is conducted at atmospheric pressure, but higher and lower pressures can be utilized. Additionally, the reaction blending type process can be conducted under numerous types of atmospheres and conditions, e.g., air, inert, $N_2$, Argon, flowing gas, static gas, reduced pressure, ambient pressure, elevated pressure, and combinations and variations of these.

In an embodiment, 850 grams of MHF (85% of total polymer mixture) is added to reaction vessel and heated to about 50° C. Once this temperature is reached the heater is turned off, and 0.20% (by weight of the MHF) of P01 Platinum catalyst is added to the MHF in the reaction vessel. Typically, upon addition of the catalyst, bubbles will form and temperature will initially rise approximately 2-20° C.

When the temperature begins to fall, about 150 g of DCPD (15 wt % of total polymer mixture) is added to the reaction vessel. The temperature may drop an additional amount, e.g., around 5-7° C.

At this point in the reaction process the temperature of the reaction vessel is controlled to, maintain a predetermined temperature profile over time, and to manage the temperature increase that may be accompanied by an exotherm. Preferably, the temperature of the reaction vessel is regulated, monitored and controlled throughout the process.

In an embodiment of the MHF/DCPD embodiment of the reaction process, the temperature profile can be as follows: let temperature reach about 80° C. (may take ~15-40 min, depending upon the amount of materials present); temperature will then increase and peak at ~104° C., as soon as temperature begins to drop, the heater set temperature is increased to 100° C. and the temperature of the reaction mixture is monitored to ensure the polymer temperature stays above 80° C. for a minimum total of about 2 hours and a maximum total of about 4 hours. After 2-4 hours above 80° C., the heater is turn off, and the polymer is cooled to ambient. It being understood that in larger and smaller batches, continuous, semi-continuous, and other type processes the temperature and time profile may be different.

In larger scale, and commercial operations, batch, continuous, and combinations of these, may be used. Industrial factory automation and control systems can be utilized to control the reaction, temperature profiles and other processes during the reaction.

Table A sets forth various embodiments of precursor materials.

TABLE A

| Material Name | degree of polymerization | Equivalents Si/mole | Equivalents O/mole | Equivalents H/mol | Equivalents Vi/mol | Equivalents methyl/mole | Equivalents C/mole | MW | grams/mole of vinyl |
|---|---|---|---|---|---|---|---|---|---|
| tetramethylcyclotetrasiloxane ($D_4$) | 4 | 4 | 4 | 4 | 0 | 4 | 4 | 240.51 | |
| MHF | 33 | 35 | 34 | 33 | 0 | 39 | 39 | 2145.345 | |
| VMF | 5 | 7 | 6 | 0 | 5 | 11 | 21 | 592.959 | 118.59 |
| TV | 4 | 4 | 4 | 0 | 4 | 4 | 12 | 344.52 | 86.13 |
| VT 0200 | 125 | 127 | 126 | 0 | 2 | 254 | 258 | 9451.206 | 4725.60 |
| VT 0020 | 24 | 26 | 25 | 0 | 2 | 52 | 56 | 1965.187 | 982.59 |
| VT 0080 | 79 | 81 | 80 | 0 | 2 | 162 | 166 | 6041.732 | 3020.87 |
| Styrene | | | | | 2 | | | 104.15 | 52.08 |
| Dicyclopentadiene | | | | | 2 | | | 132.2 | 66.10 |
| 1,4-divinylbenzene | | | | | 2 | | | 130.19 | 65.10 |
| isoprene | | | | | 2 | | | 62.12 | 31.06 |
| 1,3 Butadiene | | | | | 2 | | | 54.09 | 27.05 |
| Catalyst 10 ppm Pt | | | | | | | | | |
| Catalyst LP 231 | | | | | | | | | |

In the above table, the "degree of polymerization" is the number of monomer units, or repeat units, that are attached together to from the polymer. "Equivalents _/mol" refers to the molar equivalents. "Grams/mole of vinyl" refers to the amount of a given polymer needed to provide 1 molar equivalent of vinyl functionality. "VMH" refers to methyl vinyl fluid, a linear vinyl material from the ethoxy process, which can be a substitute for TV. The numbers "0200" etc. for VT are the viscosity (e.g., 0200=200 cps) in centipoise for that particular VT.

Curing and Pyrolysis

Precursor formulations, including the polysilocarb precursor formulations from the above types of processes, as well as others, can be cured to form a solid, semi-sold, or plastic like material. Typically, the precursor formulations are spread, shaped, or otherwise formed into a preform, which would include any volumetric structure, or shape, including thin and thick films. In curing, the polysilocarb precursor formulation may be processed through an initial cure, to provide a partially cured material, which may also be referred to, for example, as a preform, green material, or green cure (not implying anything about the material's color). The green material may then be further cured. Thus, one or more curing steps may be used. The material may be "end cured," i.e., being cured to that point at which the material has the necessary physical strength and other properties for its intended purpose. The amount of curing may be to a final cure (or "hard cure"), i.e., that point at which all, or essentially all, of the chemical reaction has stopped (as measured, for example, by the absence of reactive groups in the material, i.e., all of the reaction has stopped, or the leveling off of the decrease in reactive groups over time, i.e., essentially all of the reaction has stopped). Thus, the material may be cured to varying degrees, depending upon its intended use and purpose. For example, in some situations the end cure and the hard cure may be the same. Curing conditions such as atmosphere and temperature may effect the composition of the cured material.

In multi-layer, or composite structures and shapes, a layer of the polysilocarb material may be cured to varying degrees, for example in a multi-layer embodiment, the layers can be green cured to promote layer adhesion, then finally cured to a hard cure. Each layer in a multi-layer structure can be cured to the same degree of cure, to different degrees of cure, subject to one, two, three or more curing steps, and combinations and variations of these.

The curing may be done at standard ambient temperature and pressure ("SATP", 1 atmosphere, 25° C.), at temperatures above or below that temperature, at pressures above or below that pressure, and over varying time periods. The curing can be conducted over various heatings, rate of heating, and temperature profiles (e.g., hold times and temperatures, continuous temperature change, cycled temperature change, e.g., heating followed by maintaining, cooling, reheating, etc.). The time for the curing can be from a few seconds (e.g., less than about 1 second, less than 5 seconds), to less than a minute, to minutes, to hours, to days (or potentially longer). The curing may also be conducted in any type of surrounding environment, including for example, gas, liquid, air, water, surfactant containing liquid, inert atmospheres, $N_2$, Argon, flowing gas (e.g., sweep gas), static gas, reduced $O_2$ (e.g., an amount of $O_2$ lower than atmospheric, such as less than 20% $O_2$, less than 15% $O_2$, less than 10% $O_2$ less than 5% $O_2$), reduced pressure (e.g., less than atmospheric), elevated pressure (e.g., greater than atmospheric), enriched $O_2$, (e.g., an amount of $O_2$ greater than atmospheric), ambient pressure, controlled partial pressure and combinations and variations of these and other processing conditions.

In an embodiment, the curing environment, e.g., the furnace, the atmosphere, the container and combinations and variations of these can have materials that contribute to or effect, for example, the composition, catalysis, stoichiometry, features, performance and combinations and variations of these in the preform, the cured material, the ceramic and the final applications or products.

For high purity materials, the furnace, containers, handling equipment, atmosphere, and other components of the curing apparatus and process are clean, essentially free from, and do not contribute any elements or materials, that would be considered impurities or contaminants, to the cured material.

Preferably, in embodiments of the curing process, the curing takes place at temperatures in the range of from about 5° C. or more, from about 20° C. to about 250° C., from about 20° C. to about 150° C., from about 75° C. to about 125° C., and from about 80° C. to 90° C. Although higher and lower temperatures and various heating profiles, (e.g., rate of temperature change over time ("ramp rate", e.g., Δ degrees/time), hold times, and temperatures) can be utilized.

The cure conditions, e.g., temperature, time, ramp rate, may be dependent upon, and in some embodiments can be predetermined, in whole or in part, by the formulation to match, for example the size of the preform, the shape of the preform, or the mold holding the preform to prevent stress cracking, off gassing, or other phenomena associated with the curing process. Further, the curing conditions may be such as to take advantage of, preferably in a controlled manner, what may have previously been perceived as problems associated with the curing process. Thus, for example, off gassing may be used to create a foam material having either open or closed structure. Similarly, curing conditions can be used to create or control the microstructure and the nanostructure of the material. In general, the curing conditions can be used to affect, control or modify the kinetics and thermodynamics of the process, which can affect morphology, performance, features and functions, among other things.

Upon curing the polysilocarb precursor formulation a cross linking reaction takes place that provides in some embodiments a cross-linked structure having, among other things, by way of example, an —$R_1$—Si—C—C—Si—O—Si—C—C—Si-$R_2$— where $R_1$ and $R_2$ vary depending upon, and are based upon, the precursors used in the formulation. In an embodiment of the cured materials they may have a cross-linked structure having 3-coordinated silicon centers to another silicon atom, being separated by fewer than 5 atoms between silicon atoms. Although additional other structures and types of cured materials are contemplated. Thus, for example, use of Luperox 231 could yield a structure, from the same monomers, that was —Si—C—C—C—Si—. When other cross linking agents are used, e.g, DCPD and divinyl benzene, the number of carbons atoms between the silicon atoms will be greater than 5 atoms. A generalized formula for some embodiments of the cross-linked, e.g., cured, material, would be —Si—$R_3$—Si—, where $R_3$ would be ethyl (from for example a vinyl precursor), propyl (from for example a allyl precursor), dicyclopentane (from for example a DCPD precursor), norbornane (from for example a norbornadiene precursor), diethylbenzene (from for example a divinyl benzene precursor), and others.

During the curing process, some formulations may exhibit an exotherm, i.e., a self heating reaction, that can produce a small amount of heat to assist or drive the curing reaction, or that may produce a large amount of heat that may need to be managed and removed in order to avoid problems, such as stress fractures. During the cure off gassing typically occurs and results in a loss of material, which loss is defined generally by the amount of material remaining, e.g., cure yield. Embodiments of the formulations, cure conditions, and polysilocarb precursor formulations of embodiments of the present inventions can have cure yields of at least about 90%, about 92%, about 100%. In fact, with air cures the materials may have cure yields above 100%, e.g., about 100-105%, as a result of oxygen being absorbed from the air. Additionally, during curing the material typically shrinks, this shrinkage may be, depending upon the formulation, cure conditions, and the nature of the preform shape, and whether the preform is reinforced, filled, neat or unreinforced, from about 20%, less than 20%, less than about 15%, less than about 5%, less than about 1%, less than about 0.5%, less than about 0.25% and smaller.

Curing may be accomplished by any type of heating apparatus, or mechanisms, techniques, or morphologies that has the requisite level of temperature and environmental control. Curing may be accomplished through, for example, heated water baths, electric furnaces, microwaves, gas furnaces, furnaces, forced heated air, towers, spray drying, falling film reactors, fluidized bed reactors, indirect heating elements, direct heating (e.g., heated surfaces, drums, and plates), infrared heating, UV irradiation (light), an RF furnace, in-situ during emulsification via high shear mixing, in-situ during emulsification via ultrasonication, broad spectrum white light, IR light, coherent electromagnetic radiation (e.g. lasers, including visible, UV and IR), and convection heating, to name a few.

In an embodiment, curing may also occur under ambient conditions for an embodiment having a sufficient amount of catalyst.

If pyrolysis is conducted for an embodiment the cured material can be for example heated to about 600° C. to about 2,300° C.; from about 650° C. to about 1,200° C., from about 800° C. to about 1300° C., from about 900° C. to about 1,200° C. and from about 950° C. to 1,150° C. At these temperatures typically all organic structures are either removed or combined with the inorganic constituents to form a ceramic. Typically, at temperatures in the about 650° C. to 1,200° C. range the resulting material is an amorphous glassy ceramic. When heated above about 1,200° C. the material typically may from nano crystalline structures, or micro crystalline structures, such as SiC, $Si_3N_4$, SiCN, β SiC, and above 1,900° C. an a SiC structure may form, and at and above 2,200° C. a SiC is typically formed. The pyrolyzed, e.g., ceramic materials can be single crystal, polycrystalline, amorphous, and combinations, variations and subgroups of these and other types of morphologies.

The pyrolysis may be conducted under may different heating and environmental conditions, which preferably include thermo control, kinetic control and combinations and variations of these, among other things. For example, the pyrolysis may have various heating ramp rates, heating cycles and environmental conditions. In some embodiments, the temperature may be raised, and held a predetermined temperature, to assist with known transitions (e.g., gassing, volatilization, molecular rearrangements, etc.) and then elevated to the next hold temperature corresponding to the next known transition. The pyrolysis may take place in reducing atmospheres, oxidative atmospheres, low $O_2$, gas rich (e.g., within or directly adjacent to a flame), inert, $N_2$, Argon, air, reduced pressure, ambient pressure, elevated pressure, flowing gas (e.g., sweep gas, having a flow rate for example of from about from about 15.0 GHSV (gas hourly space velocity) to about 0.1 GHSV, from about 6.3 GHSV to about 3.1 GHSV, and at about 3.9 GHSV), static gas, and combinations and variations of these.

In some embodiments, upon pyrolization, graphenic, graphitic, amorphous carbon structures and combinations and variations of these are present in the Si—O—C ceramic. A distribution of silicon species, consisting of SiOxCy structures, which result in $SiO_4$, $SiO_3C$, $SiO_2C_2$, $SiOC_3$, and $SiC_4$ are formed in varying ratios, arising from the precursor choice and their processing history. Carbon is generally bound between neighboring carbons and/or to a Silicon atom. In general, in the ceramic state, carbon is largely not coordinated to an oxygen atom, thus oxygen is largely coordinated to silicon The pyrolysis may be conducted in any heating apparatus, that maintains the request temperature and environmental controls. Thus, for example pyrolysis may be done with, pressure furnaces, box furnaces, tube furnaces, crystal-growth furnaces, graphite box furnaces, arc melt furnaces, induction furnaces, kilns, $MoSi_2$ heating element furnaces, carbon furnaces, vacuum furnaces, gas fired furnaces, electric furnaces, direct heating, indirect heating, fluidized beds, RF furnaces, kilns, tunnel kilns, box kilns, shuttle kilns, coking type apparatus, lasers, microwaves, other electromagnetic radiation, and combinations and variations of these and other heating apparatus and systems that can obtain the request temperatures for pyrolysis.

In embodiments of the polysilocarb derived ceramic materials has any of the amounts of Si, O, C for the total amount of material that are set forth in the Table B.

TABLE B

|  | Si | | O | | C | |
| --- | --- | --- | --- | --- | --- | --- |
|  | Lo | Hi | Lo | Hi | Lo | Hi |
| Wt % | 35.00% | 50.00% | 10.00% | 35.00% | 5.00% | 30.00% |
| Mole Ratio | 1.000 | 1.429 | 0.502 | 1.755 | 0.334 | 2.004 |
| Mole % | 15.358% | 63.095% | 8.821% | 56.819% | 6.339% | 57.170% |

In general, embodiments of the pyrolized ceramic polysilocarb materials can have about 20% to about 65% Si, can have about 5% to about 50% 0, and can have about 3% to about 55% carbon weight percent. Greater and lesser amounts are also contemplated.

In general, embodiment of the pyrolized ceramic polysilocarb materials can have a mole ratio (based on total Si, 0, and C) of about 0.5 to about 2.5 for Si, can have a mole ratio of about 0.2 to about 2.5 for 0, and can have a mole ration of about 0.1 to about 4.5 for C. Greater and lesser amounts are also contemplated.

In general, embodiment of the pyrolized ceramic polysilocarb materials can have a mole % (percentage of total Si, 0, and C) of about 13% to about 68% for Si, can have a mole % of about 6% to about 60% for 0, and can have a mole % of about 4% to about 75% for C. Greater and lesser amounts are also contemplated.

The type of carbon present in embodiments of the polysilocarb derived ceramic pigments can be free carbon, (e.g., turbostratic, amorphous, graphenic, graphitic forms of carbon) and carbon that is bound to silicon. Embodiments of ceramic polysilocarb materials having free carbon and silicon-bound-carbon (Si—C) are set forth in Table C. Greater and lesser amounts and different percentages of free carbon and silicon-bound-carbon are also contemplated.

TABLE C

| Embodiment | % Free Carbon | % Si—C type |
|---|---|---|
| 1 | 64.86 | 35.14 |
| 2 | 63.16 | 36.85 |
| 3 | 67.02 | 32.98 |
| 4 | 58.59 | 41.41 |
| 5 | 68.34 | 31.66 |
| 6 | 69.18 | 30.82 |
| 7 | 65.66 | 34.44 |
| 8 | 72.74 | 27.26 |
| 9 | 72.46 | 27.54 |
| 10 | 78.56 | 21.44 |

Generally, embodiments of polysilocarb derived ceramic materials can have from about 30% free carbon to about 70% free carbon, from about 20% free carbon to about 80% free carbon, and from about 10% free carbon to about 90% free carbon, and from about 30% Si—C bonded carbon to about 70% Si—C bonded carbon, from about 20% Si—C bonded carbon to about 80% Si—C bonded carbon, and from about 10% Si—C bonded carbon to about 90% Si—C bonded carbon. Greater and lesser amounts are also contemplated.

Metals and Metal Complexes

By way of example, metals and metal complexes that can be used as fill material would include Cyclopentadienyl compounds of the transition metals can be utilized. Cyclopentadienyl compounds of the transition metals can be organized into two classes: Bis-cyclopentadienyl complexes; and Mono-cyclopentadienyl complexes. Cyclopentadienyl complexes can include $C_5H_5$, $C_5Me_5$, $C_5H_4Me$, $CH_5R_5$ (where R=Me, Et, Propyl, i-Propyl, butyl, Isobutyl, Sec-butyl). In either of these cases Si can be directly bonded to the Cyclopentadienyl ligand or the Si center can be attached to an alkyl chain, which in turn is attached to the Cyclopentadienyl ligand.

Cyclopentadienyl complexes, that can be utilized with precursor formulations and in products, can include: bis-cyclopentadienyl metal complexes of first row transition metals (Titanium, Vanadium, Chromium, Iron, Cobalt, Nickel); second row transition metals (Zirconium, Molybdenum, Ruthenium, Rhodium, Palladium); third row transition metals (Hafnium, Tantalum, Tungsten, Iridium, Osmium, Platinum); Lanthanide series (La, Ce, Pr, Nd, Pm, Sm, Eu, Gd, Tb, Dy, Ho); and Actinide series (Ac, Th, Pa, U, Np).

Monocyclopentadienyl complexes may also be utilized to provide metal functionality to precursor formulations and would include monocyclopentadienyl complexes of: first row transition metals (Titanium, Vanadium, Chromium, Iron, Cobalt, Nickel); second row transition metals (Zirconium, Molybdenum, Ruthenium, Rhodium, Palladium); third row transition metals (Hafnium, Tantalum, Tungsten, Iridium, Osmium, Platinum) when preferably stabilized with proper ligands, (for instance Chloride or Carbonyl).

Alkyl complexes of metals may also be used to provide metal functionality to precursor formulations and products. In these alkyl complexes the Si center has an alkyl group (ethyl, propyl, butyl, vinyl, propenyl, butenyl) which can bond to transition metal direct through a sigma bond. Further, this would be more common with later transition metals such as Pd, Rh, Pt, Ir.

Coordination complexes of metals may also be used to provide metal functionality to precursor formulations and products. In these coordination complexes the Si center has an unsaturated alkyl group (vinyl, propenyl, butenyl, acetylene, butadienyl) which can bond to carbonyl complexes or ene complexes of Cr, Mo, W, Mn, Re, Fe, Ru, Os, Co, Rh, Ir, Ni. The Si center may also be attached to a phenyl, substituted phenyl or other aryl compound (pyridine, pyrimidine) and the phenyl or aryl group can displace carbonyls on the metal centers.

Metal alkoxides may also be used to provide metal functionality to precursor formulations and products. Metal alkoxide compounds can be mixed with the silicon precursor compounds and then treated with hydroxide to form the oxides at the same time as the polymer, copolymerizes. This can also be done with metal halides and metal amides. Preferably, this may be done using early transition metals along with Aluminum, Gallium and Indium, later transition metals: Fe, Mn, Cu, and alkaline earth metals: Ca, Sr, Ba, Mg.

Compounds where Si is directly bonded to a metal center which is stabilized by halide or organic groups may also be utilized to provide metal functionality to precursor formulations and products.

Additionally, it should be understood that the metal and metal complexes may be the continuous phase after pyrolysis, or subsequent heat treatment. Formulations can be specifically designed to react with selected metals to in situ form metal carbides, oxides and other metal compounds, generally known as cermets (e.g., ceramic metallic compounds). The formulations can be reacted with selected metals to form in situ compounds such as mullite, alumino silicate, and others. The amount of metal relative to the amount of silica in the formulation or end product can be from about 0.1 mole % to 99.9 mole %, about 1 mole % or greater, about 10 mole % or greater, and about 20 mole percent or greater. The forgoing use of metals with the present precursor formulas can be used to control and provide predetermined stoichiometries.

HEADINGS AND EMBODIMENTS

It should be understood that the use of headings in this specification is for the purpose of clarity, and is not limiting in any way. Thus, the processes and disclosures described under a heading should be read in context with the entirely of this specification, including the various examples. The use of headings in this specification should not limit the scope of protection afford the present inventions.

It is noted that there is no requirement to provide or address the theory underlying the novel and groundbreaking processes, materials, performance or other beneficial features and properties that are the subject of, or associated with, embodiments of the present inventions. Nevertheless, various theories are provided in this specification to further advance the art in this area. The theories put forth in this specification, and unless expressly stated otherwise, in no way limit, restrict or narrow the scope of protection to be afforded the claimed inventions. These theories many not be required or practiced to utilize the present inventions. It is further understood that the present inventions may lead to new, and heretofore unknown theories to explain the function-features of embodiments of the methods, articles, materials, devices and system of the present inventions; and such later developed theories shall not limit the scope of protection afforded the present inventions.

The various embodiments of formulations, compositions, articles, plastics, ceramics, materials, parts, uses, applications, equipment, methods, activities, and operations set forth in this specification may be used for various other fields and for various other activities, uses and embodiments. Additionally, these embodiments, for example, may be used with: existing systems, articles, compositions, plastics, ceramics, operations or activities; may be used with systems, articles, compositions, plastics, ceramics, operations or activities that may be developed in the future; and with such systems, articles, compositions, plastics, ceramics, operations or activities that may be modified, in-part, based on the teachings of this specification. Further, the various embodiments and examples set forth in this specification may be used with each other, in whole or in part, and in different and various combinations. Thus, for example, the configurations provided in the various embodiments and examples of this specification may be used with each other; and the scope of protection afforded the present inventions should not be limited to a particular embodiment, example, configuration or arrangement that is set forth in a particular embodiment, example, or in an embodiment in a particular Figure.

The invention may be embodied in other forms than those specifically disclosed herein without departing from its spirit or essential characteristics. The described embodiments are to be considered in all respects only as illustrative and not restrictive.

What is claimed:

1. A black cement comprising a dry powdered cement and a black SiOC ceramic pigment; wherein the dry powdered cement is selected from the group consisting of roman cement, portland cement and hydraulic cement; wherein the black cement is configured to provide a uniform black color to an entire structure formed by the curing of the black cement.

2. The cement of claim 1, comprising about 6% to about 15% black SiOC ceramic pigment.

3. The cement of claim 2, comprising at least about 8% black SiOC ceramic pigment.

4. The cement of claim 2, comprising at least about 10% black SiOC ceramic pigment.

5. The cement of claim 1, wherein the black SiOC ceramic pigment comprises from about 30 weight % to about 60 weight % silicon, from about 5 weight % to about 40 weight % oxygen, and carbon; wherein about 20 weight % to about 80 weight % of the carbon is free carbon.

6. The cement of claim 1, wherein the black SiOC ceramic pigment comprises from about 20% to about 65% Si, about 5% to about 50% O, and about 3% to about 55% carbon weight percent.

7. The cement of claim 1, wherein the black SiOC ceramic pigment comprises from about 15.3 mole % to about 63.1 mole % silicon, from about 8.8 mole % to about 56.8 mole % oxygen, and at least about 6.3 mole % carbon and wherein about 20 weight % to about 80 weight % of the carbon is silicon-bound-carbon.

8. A black concrete comprising a dry powdered cement, aggregate and a black SiOC pigment.

9. The concrete of claim 8, comprising at least about 8% ceramic pigment to cement.

10. The concrete of claim 8, wherein the black SiOC ceramic pigment comprises from about 30 weight % to about 60 weight % silicon, from about 5 weight % to about 40 weight % oxygen, and carbon; wherein about 20 weight % to about 80 weight % of the carbon is free carbon.

11. The concrete of claim 8, wherein the black SiOC ceramic pigment comprises from about 20% to about 65% Si, about 5% to about 50% O, and about 3% to about 55% carbon weight percent.

12. A black cement, concrete, stucco or plaster structure comprising:
 a. a first material and a second material;
 b. wherein the first material defines a first material weight percent of the cement, concrete, stucco or plaster structure; wherein the first material is selected from the group consisting of cement, concrete, stucco and plaster;
 c. wherein the second material defines a second material weight percent of the cement, concrete, stucco or plaster structure; wherein the second material is a black polymer derived ceramic pigment;
 d. wherein the first material weight percent is larger than the second material weight percent;
 e. wherein the black polymer derived ceramic pigment is uniformly distributed in the first material, thereby providing a uniform black color throughout the entirety of the structure.

13. The cement, concrete, stucco or plaster structure claim 12, wherein the pigment comprises from about 20 weight % to about 65 weight % silicon, from about 5 weight % to about 40 weight % oxygen, and at least 5% carbon.

14. The cement, concrete, stucco or plaster of structure claim 13, wherein 20 weight % to 80 weight % of the carbon is free carbon.

15. The cement, concrete, stucco or plaster of structure claim 13, wherein 20 weight % to 80 weight % of the carbon is silicon-bound-carbon.

16. The cement, concrete, stucco or plaster of structure claim 12, wherein the black polymer derived ceramic pigment has a particle size of less than about 1.5 µm.

17. The cement, concrete, stucco or plaster of claim structure 12, wherein the black polymer derived ceramic pigment has a particle size $D_{50}$ of from about 1 µm to about 0.1 µm.

18. The cement, concrete, stucco or plaster structure of claim 12, wherein the black color defines a blackness selected from the group consisting of: PMS 433, Black 3, Black 3, Black 4, Black 5, Black 6, Black 7, Black 2 2×, Black 3 2×, Black 4 2×, Black 5 2×, Black 6 2×, and Black 7 2×.

19. The cement, concrete, stucco or plaster structure of claim 13, wherein the black color defines a blackness selected from the group consisting of: PMS 433, Black 3, Black 3, Black 4, Black 5, Black 6, Black 7, Black 2 2×, Black 3 2×, Black 4 2×, Black 5 2×, Black 6 2×, and Black 7 2×.

* * * * *